(12) United States Patent
Soria Moreno et al.

(10) Patent No.: US 12,674,421 B2
(45) Date of Patent: Jul. 7, 2026

(54) SYSTEM AND METHOD FOR CALIBRATING HYDRAULIC STARTERS FOR TURBOMACHINES

(71) Applicant: GE Vernova Infrastructure Technology LLC, Greenville, SC (US)

(72) Inventors: Uriel Eduardo Soria Moreno, Querétaro (MX); Carolina Ledesma Prieto, Querétaro (MX); Mario Alfonso Trejo Chavez, Pedro Escobedo (MX); Diego Omar Sánchez Gómez, Querétaro (MX); Jose Alfredo Guerrero Ochoa, Querétaro (MX)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 15 days.

(21) Appl. No.: 18/891,473

(22) Filed: Sep. 20, 2024

(65) Prior Publication Data

US 2026/0085637 A1 Mar. 26, 2026

(51) Int. Cl.
*F02C 7/27* (2006.01)
*F01D 19/00* (2006.01)

(52) U.S. Cl.
CPC ............... *F02C 7/27* (2013.01); *F01D 19/00* (2013.01); *F05D 2220/31* (2013.01); *F05D 2220/32* (2013.01); *F05D 2260/85* (2013.01)

(58) Field of Classification Search
CPC ........ F02C 7/268; F02C 7/27; F05D 2260/85; F01D 19/00
See application file for complete search history.

(56) References Cited

U.S. PATENT DOCUMENTS

| | | |
|---|---|---|
| 2011/0040470 A1 | 2/2011 | Qiu et al. |
| 2012/0063883 A1 | 3/2012 | Bei et al. |
| 2012/0130553 A1 | 5/2012 | Purani et al. |
| 2014/0178175 A1 | 6/2014 | Kalkovich et al. |
| 2020/0088103 A1 | 3/2020 | Ajami et al. |

OTHER PUBLICATIONS

European Search Report corresponding to Application No. 25199267.3 dated Feb. 17, 2026.

*Primary Examiner* — Abiy Teka
(74) *Attorney, Agent, or Firm* — Dority & Manning, P.A.

(57) ABSTRACT

Systems and methods are provided for calibrating a hydraulic starter for a turbomachine. A hydraulic fluid source supplies fluid at a high pressure or at a low pressure for rotatably driving the hydraulic starter, and a valve is movable to adjust a flow rate of the fluid supplied from the hydraulic fluid source to the hydraulic starter. The hydraulic fluid source and operation of the valve are automatically controlled by a computing system to sequentially perform a plurality of base modes with the valve being in either a fully closed position or a fully opened position. The plurality of base modes includes at least one standby mode test and at least one crank speed mode test. A rotational speed of the turbomachine detected by a speed sensor during each of the plurality of base modes is monitored by the computing system for calibrating the hydraulic starter.

20 Claims, 11 Drawing Sheets

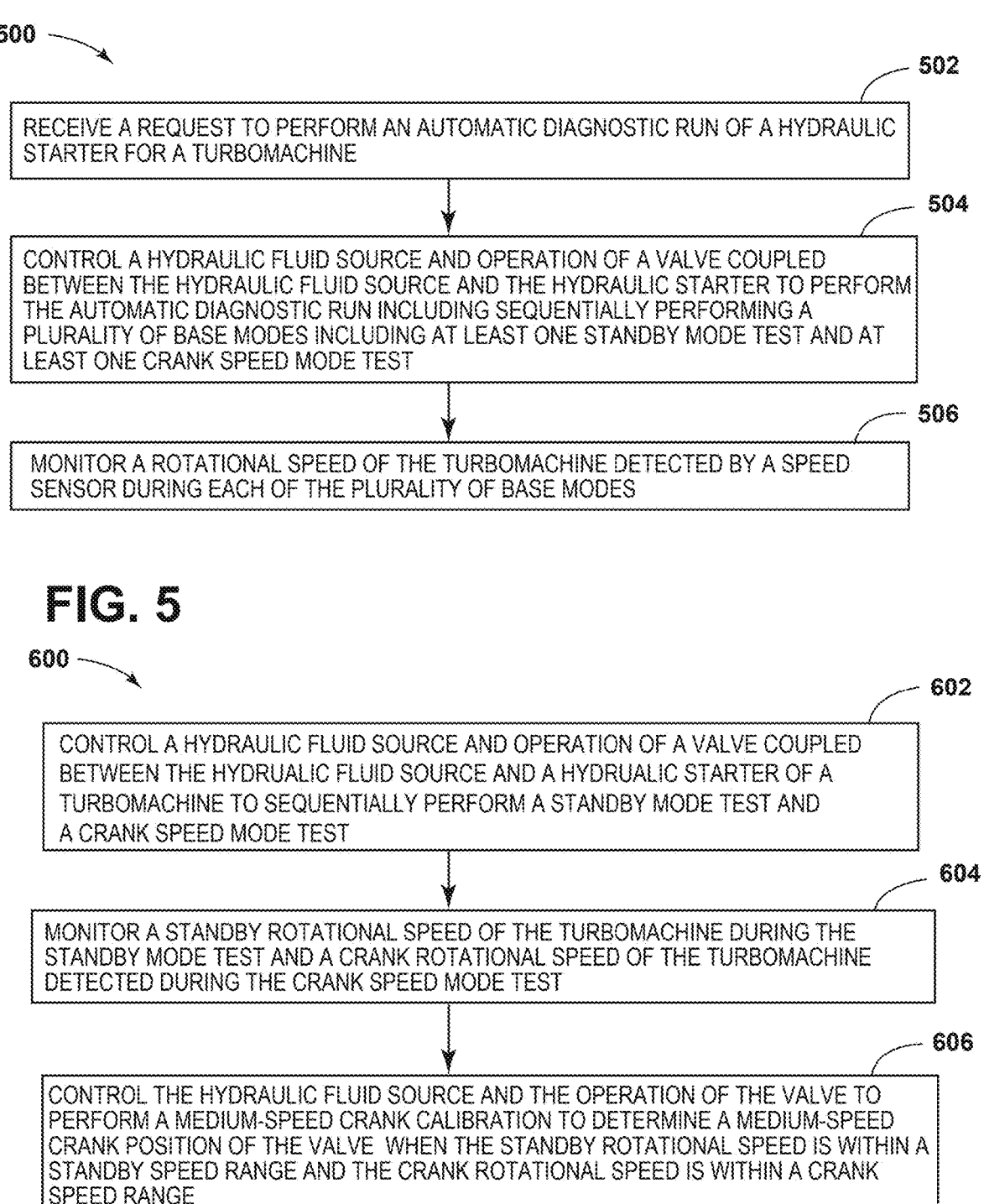

500

502

RECEIVE A REQUEST TO PERFORM AN AUTOMATIC DIAGNOSTIC RUN OF A HYDRAULIC STARTER FOR A TURBOMACHINE

504

CONTROL A HYDRAULIC FLUID SOURCE AND OPERATION OF A VALVE COUPLED BETWEEN THE HYDRAULIC FLUID SOURCE AND THE HYDRAULIC STARTER TO PERFORM THE AUTOMATIC DIAGNOSTIC RUN INCLUDING SEQUENTIALLY PERFORMING A PLURALITY OF BASE MODES INCLUDING AT LEAST ONE STANDBY MODE TEST AND AT LEAST ONE CRANK SPEED MODE TEST

506

MONITOR A ROTATIONAL SPEED OF THE TURBOMACHINE DETECTED BY A SPEED SENSOR DURING EACH OF THE PLURALITY OF BASE MODES

CONTROL A HYDRAULIC FLUID SOURCE AND OPERATION OF A VALVE COUPLED BETWEEN THE HYDRUALIC FLUID SOURCE AND A HYDRUALIC STARTER OF A TURBOMACHINE TO SEQUENTIALLY PERFORM A STANDBY MODE TEST AND A CRANK SPEED MODE TEST

604

MONITOR A STANDBY ROTATIONAL SPEED OF THE TURBOMACHINE DURING THE STANDBY MODE TEST AND A CRANK ROTATIONAL SPEED OF THE TURBOMACHINE DETECTED DURING THE CRANK SPEED MODE TEST

606

CONTROL THE HYDRAULIC FLUID SOURCE AND THE OPERATION OF THE VALVE TO PERFORM A MEDIUM-SPEED CRANK CALIBRATION TO DETERMINE A MEDIUM-SPEED CRANK POSITION OF THE VALVE  WHEN THE STANDBY ROTATIONAL SPEED IS WITHIN A STANDBY SPEED RANGE AND THE CRANK ROTATIONAL SPEED IS WITHIN A CRANK SPEED RANGE

FIG. 6

SYSTEM AND METHOD FOR CALIBRATING HYDRAULIC STARTERS FOR TURBOMACHINES

FIELD OF THE INVENTION

The present disclosure relates generally to hydraulic starters for turbomachines. Specifically, the present disclosure relates to calibrating hydraulic starters for turbomachines.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

A gas turbine engine can utilize a hydraulic starter to provide motive power for accelerating the gas turbine engine to an initial speed before fuel ignition occurs in the gas turbine engine, where the ignition creates and imparts additional thermal energy for bringing the gas turbine engine to the desired speed without further assistance of the starter. However, if the hydraulic starter is not adequately calibrated, air might not be acceptably purged for ignition of the gas turbine engine during cranking, gas turbine engine components may be damaged if the torque of the hydraulic starter exceeds the expected torque during cranking, there may be inappropriate cooling of the gas turbine engine if the starter speed is too high or too low during standby, and/or the like. However, it is difficult for operators to identify inadequacies in calibration across different modes when operating the gas turbine engine. Moreover, an inexperienced operator may not know what variances are acceptable for each mode.

As such, systems and methods for calibrating hydraulic starters for turbomachines would be welcome in the art.

BRIEF DESCRIPTION

Aspects and advantages of the present disclosure will be set forth in part in the following description, or may be obvious from the description, or may be learned through practice of the technology.

In one aspect, the present subject matter is directed to a system for calibrating hydraulic starters for turbomachines. The system may include a hydraulic fluid source operable to supply a fluid at a high pressure or at a low pressure. The system may further include a hydraulic starter rotatably driven by the fluid from the hydraulic fluid source. Further, the system may include a flow rate valve fluidly coupled between the hydraulic fluid source and the hydraulic starter, where the flow rate valve may be movable between a plurality of positions including a fully closed position and a fully opened position to adjust a flow rate of the fluid supplied from the hydraulic fluid source to the hydraulic starter, where the flow rate may be a lowest rate when the flow rate valve is in the fully closed position, and where the flow rate may be a highest rate when the flow rate valve is in the fully opened position. Moreover, the system may include a speed sensor configured to detect a rotational speed of the turbomachine. Additionally, the system may include a computing system. The computing system may be configured to receive a request to perform an automatic diagnostic run of the hydraulic starter. The computing system may further be configured to control the hydraulic fluid source and operation of the flow rate valve to perform the automatic diagnostic run based at least in part on the request. The automatic diagnostic run may include automatically sequentially performing a plurality of base modes, where the flow rate valve may be in either the fully closed position or the fully opened position in the plurality of base modes, and where the plurality of base modes may include at least one standby mode test and at least one crank speed mode test. The flow rate valve may be in the fully closed position for each of the at least one standby mode test, and the flow rate valve may be in the fully opened position for each of the at least one crank speed mode test. The computing system may further be configured to monitor the rotational speed of the turbomachine during each of the plurality of base modes.

In a further aspect, the present subject matter is directed to a method for calibrating a hydraulic starter for a turbomachine. A hydraulic fluid source may be operable to supply a fluid at a high pressure or at a low pressure for rotatably driving the hydraulic starter, and a flow rate valve may be fluidly coupled between the hydraulic fluid source and the hydraulic starter. The flow rate valve may be movable between a plurality of positions including a fully closed position and a fully opened position to adjust a flow rate of the fluid supplied from the hydraulic fluid source to the hydraulic starter, where the flow rate may be a lowest rate when the flow rate valve is in the fully closed position, and where the flow rate may be a highest rate when the flow rate valve is in the fully opened position. The method may include receiving, by a computing system, a request to perform an automatic diagnostic run of the hydraulic starter. The method may further include controlling, automatically by the computing system, the hydraulic fluid source and operation of the flow rate valve to perform the automatic diagnostic run based at least in part on the request, where the automatic diagnostic run may include sequentially performing a plurality of base modes. The flow rate valve may be in either the fully closed position or the fully opened position in the plurality of base modes. The plurality of base modes may include at least one standby mode test and at least one crank speed mode test, where the flow rate valve may be in the fully closed position for each of the at least one standby mode test, and where the flow rate valve may be in the fully opened position for each of the at least one crank speed mode test. Additionally, the method may include monitoring, by the computing system, a rotational speed of the turbomachine detected by a speed sensor during each of the plurality of base modes.

In an additional aspect, the present subject matter is directed to a method for calibrating a hydraulic starter for a turbomachine. A hydraulic fluid source may be operable to supply a fluid at a high pressure or at a low pressure for rotatably driving the hydraulic starter, while a flow rate valve may be fluidly coupled between the hydraulic fluid source and the hydraulic starter, where the flow rate valve may be movable to adjust a flow rate of the fluid supplied from the hydraulic fluid source to the hydraulic starter. The flow rate may be a lowest rate when the flow rate valve is in a fully closed position, and the flow rate may be a highest rate when the flow rate valve is in a fully opened position. The method may include controlling, automatically by a computing system, the hydraulic fluid source and operation of the flow rate valve to sequentially perform a standby mode test and a crank speed mode test, where the flow rate valve may be in the fully closed position for the standby mode test, and where the flow rate valve may be in the fully opened position for the crank speed mode test. The method may further include monitoring, by the computing system, a standby rotational speed of the turbomachine during the standby mode test and a crank rotational speed of the turbomachine during the crank speed mode test. Additionally, the method may include controlling, automatically by the computing system, when the standby rotational speed is within a standby speed range and the crank rotational speed is within a crank speed range, the hydraulic fluid source and the operation of the flow rate valve to perform a medium-speed crank calibration to determine a medium-speed crank position of the flow rate valve. A rotational speed of the turbomachine may be within a medium-speed range when the hydraulic fluid source supplies the fluid at the high pressure and the flow rate valve is in the medium-speed crank position.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which:

FIG. 5 illustrates a flow diagram of one method for calibrating a hydraulic starter for a turbomachine in accordance with aspects of the present disclosure; and FIG. 6 illustrates a flow diagram of a further method for calibrating a hydraulic starter for a turbomachine in accordance with aspects of the present disclosure.

Figure 1:
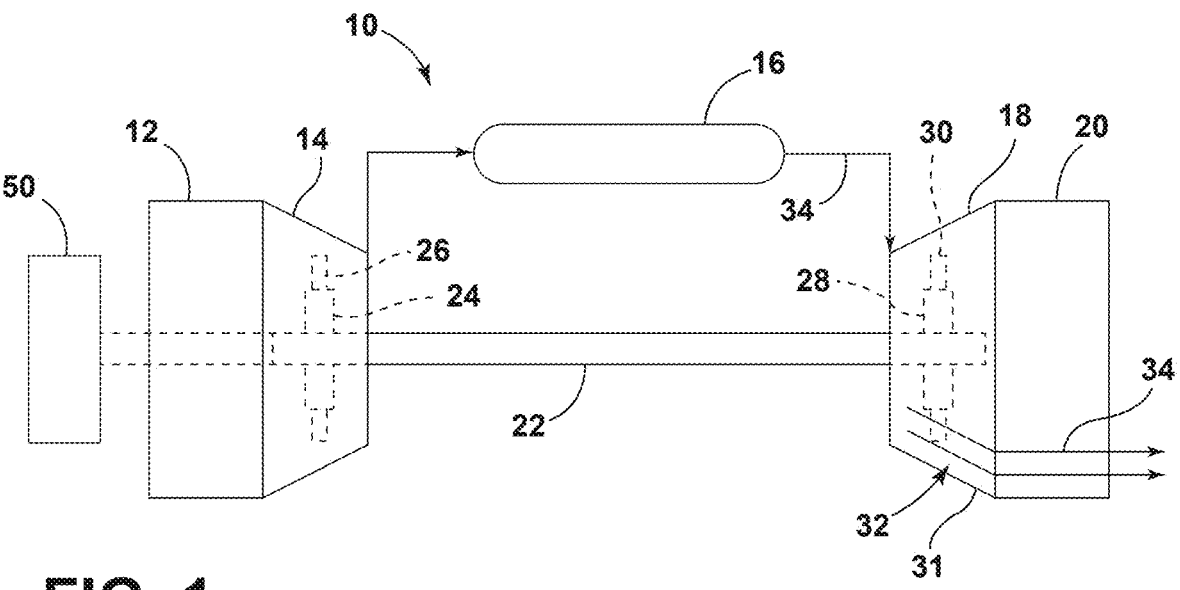
FIG. 1 is a schematic illustration of a turbomachine in accordance with aspects of the present disclosure.

Repeat use of reference characters in the present specification and drawings is intended to represent the same or analogous features or elements of the present technology.

DETAILED DESCRIPTION

Reference now will be made in detail to embodiments of the present invention, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "fluidly coupled" may refer to any suitable combination of pipe(s), hose(s), tube(s), or other fluid carrying conduit(s) for transferring fluid between components.

In general, the present subject matter is directed to systems and methods for calibrating hydraulic starters for turbomachines. More specifically, hydraulic starters may be operable in a plurality of base modes depending on a requested torque output. For instance, a fluid source of the hydraulic starter may be operable to supply fluid at a high pressure or a low pressure, and a flow rate valve of the hydraulic starter may be operable to adjust a flow rate of the fluid supplied from the fluid source to a starter motor of the hydraulic starter such that different combinations of output torque and output speed of the starter motor may be established in the different base modes. For example, the base modes may include standby modes, such as a low-speed standby mode and a high-speed standby mode, and crank modes, such as a low-speed crank mode and a high-speed crank mode. The fluid source supplies fluid at low pressure in the low-speed modes and at high pressure in the high-speed modes, and the flow rate valve is in a fully closed position in the standby modes and a fully opened position in the base crank modes. If the operation of one or more components of the hydraulic starter is improperly calibrated and/or has partially or completely failed, air might not be acceptably purged for ignition during cranking of the turbomachine, turbomachine components may be damaged if the torque of the hydraulic starter exceeds the expected torque during cranking, and/or there may be inappropriate cooling of the turbomachine. However, it is difficult for operators to identify inadequacies in calibration across different operating modes of the hydraulic starter when operating the turbomachine.

As such, in accordance with aspects of the present subject matter, a method is proposed for calibrating the hydraulic starter while the turbomachine is not operated. The method includes automatically controlling the hydraulic starter to sequentially perform a plurality of the base operating modes while monitoring a rotational speed of the turbomachine (or of the starter motor) detected by a speed sensor in each of the base operating modes. Based on the monitored rotational speeds for each of the base operating modes, an operator may make a more informed decision on the status of the calibration of the hydraulic starter before further calibrating the hydraulic starter. In some instances, the method may further include automatically controlling the hydraulic starter to perform a medium-speed crank calibration if the base operating modes are determined to be calibrated.

Referring now to the drawings, FIG. 1 illustrates a schematic diagram of one embodiment of a turbomachine, which in the illustrated embodiment is a gas turbine 10. Gas turbine 10 may be an industrial or land-based gas turbine, however the present disclosure is not limited to a land based and/or industrial gas turbine. Moreover, the invention as described herein may use any suitable type of turbomachine including, but not limited to, a steam turbine, an aircraft gas turbine, or a marine gas turbine.

As shown, gas turbine 10 generally includes an inlet section 12, a compressor section 14 disposed downstream of inlet section 12, a plurality of combustors (not shown) within a combustor section 16 disposed downstream of compressor section 14, a turbine section 18 disposed downstream of combustor section 16, and an exhaust section 20 disposed downstream of turbine section 18. Additionally, gas turbine 10 may include one or more shafts 22 coupled between compressor section 14 and turbine section 18.

Compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of shaft 22 that extends through the compressor section 14. Compressor section 14 may further include one or more stator vanes (not shown) arranged circumferentially around shaft 22. Stator vanes may be fixed to a compressor casing or static casing that extends circumferentially around rotor blades 26.

Turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of shaft 22 that extends through turbine section 18. Turbine section 18 further includes a turbine casing 31 that circumferentially surrounds a portion of shaft 22 and rotor blades 30, thereby at least partially defining a hot gas path 32 through turbine section 18. Turbine casing 31 may be configured to support a plurality of stages of stationary nozzles (not shown) extending radially inwardly from the inner circumference of turbine casing 31.

During operation, a working fluid such as air flows through inlet section 12 and into compressor section 14 where the air is progressively compressed, thus providing pressurized air to the combustors of combustor section 16. The pressurized air is mixed with fuel and burned within each combustor to produce combustion gases 34. Combustion gases 34 flow through hot gas path 32 from combustor section 16 into turbine section 18, wherein energy (kinetic and/or thermal) is transferred from combustion gases 34 to rotor blades 30, causing shaft 22 to rotate. The mechanical rotational energy may then be used to provide torque as a mechanical drive (e.g., to power compressor section 14, to drive ship propulsion, etc.) and/or to generate electricity. Combustion gases 34 exiting turbine section 18 may then be exhausted from gas turbine 10 via exhaust section 20.

Additionally, as will be described below in greater detail, a hydraulic starter 50 is provided for use with gas turbine 10. More particularly, hydraulic starter 50 may be used to provide motive power for accelerating gas turbine 10 to an initial speed before fuel ignition occurs in gas turbine 10. While hydraulic starter 50 is described as being selectively driven by flow of hydraulic fluid, it should be appreciated that hydraulic starter 50 may be selectively powered by any suitable compressible or pressurizable liquid, such as air, hydraulic fluid (e.g., lubricant, oil, etc.), and/or the like.

Figure 2:
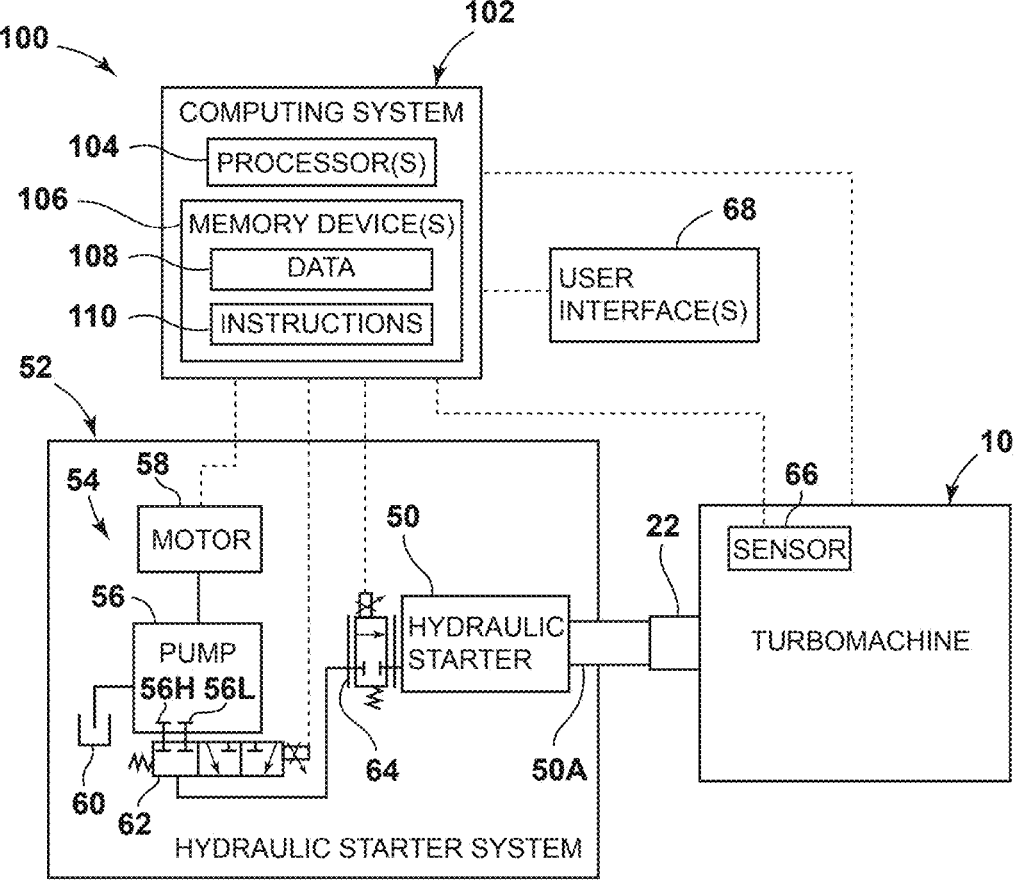
FIG. 2 is a schematic illustration of a system for calibrating a hydraulic starter for a turbomachine in accordance with aspects of the present disclosure.

Turning now to FIG. 2, a schematic illustration of a system 100 for calibrating a hydraulic starter for a turbomachine, such as hydraulic starter 50 of gas turbine 10, is illustrated in accordance with aspects of the present disclosure. As shown, system 100 includes turbomachine 10, hydraulic starter 50, and a computing system 102. Hydraulic starter 50 is particularly part of a hydraulic starter system 52 that includes hydraulic starter 50 and a hydraulic fluid source 54, where hydraulic fluid source 54 is controllable for driving the hydraulic starter 50. More particularly, hydraulic starter 50 may have one or more components (e.g., rotor(s), etc.) which are rotatably driven by fluid provided from hydraulic fluid source 54 and configured to rotate an output shaft 50A of hydraulic starter 50 (directly or indirectly via a gearbox). Output shaft 50A may be selectively rotatably coupled or connectable to a shaft (e.g., input shaft 22) of turbomachine 10 such that output shaft 50A of hydraulic starter 50 and shaft 22 of turbomachine 10 rotate conjointly to bring the shaft 22 of turbomachine 10 up to speed for ignition.

Hydraulic fluid source 54 may be operable to supply fluid at a plurality of pressures, such as at least a high pressure and a low pressure. For instance, in some embodiments, hydraulic fluid source 54 particularly includes a pump 56 driven by a pump motor 58 to direct fluid from a reservoir 60 towards hydraulic starter 50. In one embodiment, pump 56 may be variably driven by pump motor 58 to supply fluid at different pressures. However, in some instances, pump 56 may be driven by pump motor 58 at a substantially constant operating speed for supplying fluid. In such instances, pump 56 includes a high pressure port 56H and a low pressure port 56L, where fluid exiting pump 56 through high pressure port 56H is supplied at a high pressure and fluid exiting pump 56 through low pressure port 56L is supplied at a low pressure, with the high pressure being higher than the low pressure. Hydraulic fluid source 54 may further include a supply actuator 62 for controlling supply of fluid through high pressure port 56H or low pressure port 56L. For instance, supply actuator 62 may be a solenoid actuated valve actuatable to direct fluid through high pressure port 56H, low pressure port 56L, or close the pump 56 (e.g., where fluid is not directed through either of high or low pressure ports 56H, 56L). However, in some instances, supply actuator 62 may be any other suitable actuator for selecting high pressure port 56H or low pressure port 56L.

A flow rate of the fluid supplied from hydraulic fluid source 54 may be adjusted by a flow rate valve 64 fluidly coupled between hydraulic fluid source 54 and hydraulic starter 50. For instance, flow rate valve 64 may be movable between a plurality of positions including a fully closed position and a fully opened position to adjust a flow rate of the fluid supplied from hydraulic fluid source 54 to the hydraulic starter 50. The flow rate is a lowest rate when the flow rate valve is in the fully closed position, and the flow rate is a highest rate when the flow rate valve is in the fully opened position. Flow rate valve 64 may be a solenoid operated proportional control valve movable to the fully closed position (as shown), the fully opened position, or to any position between the fully closed position and the fully opened position, where the flow rate provided through the flow rate valve 64 is proportional to the distance between the fully closed and opened positions (e.g., is proportionally between the lowest and highest flow rates). However, flow rate valve 64 may be any other suitable type of valve, having any suitable number of positions.

Generally, hydraulic starter system 52 may be controlled to perform various different start up modes for turbomachine 10 to provide different combinations of speed and torque to turbomachine 10. For instance, the different start up modes may include a plurality of base modes, such as at least one standby mode (e.g., a low-speed standby mode, a high-speed standby mode, etc.) and at least one startup mode (e.g., a low-speed startup mode, a high-speed startup mode, etc.). In each standby mode, supply actuator 62 is controlled to supply fluid from pump 56 (e.g., through high pressure port 56H for the high-speed standby mode or through low pressure port 56L for the low-speed standby mode), but flow rate valve 64 is configured to be moved into the fully closed position such that little to no hydraulic fluid is supplied to hydraulic starter 50 (e.g., fluid is supplied to the hydraulic starter 50 at the lowest flow rate). As such, hydraulic starter 50 is configured to be ready to rotate, but does not rotate, or rotates at very low speeds, in the standby modes. Conversely, in each base startup mode, supply actuator 62 is similarly controlled to supply fluid from pump 56 (e.g., through high pressure port 56H for the high-speed standby mode or through low pressure port 56L for the low-speed standby mode), but flow rate valve 64 is configured to be moved into the fully opened position such that substantially all the hydraulic fluid from the pump 56 is supplied to hydraulic starter 50 (e.g., fluid is supplied to the hydraulic starter 50 at the highest flow rate). As such, hydraulic starter 50 is configured to rotate in each startup mode, but with a higher rotational speed in the high-speed crank mode than in the low-speed crank mode. The rotational speed of the turbomachine may be monitored by a sensor 66. Sensor 66 may be any suitable rotational speed sensor or combination of sensors, such as a rotary encoder(s), positioned at any suitable location for determining the rotational speed of at least one component of the turbomachine 10, such as shaft 22, rotor disk 24, and/or rotor disk 28), and/or the rotational speed of a least one component of hydraulic starter 50, such as output shaft 50A.

However, it is often difficult for an operator to determine where a failure occurs in the hydraulic starter system 52 across the different modes. As such, as will be described below in greater detail, hydraulic starter system 52 may be controlled by computing system 102 to perform a calibration, wherein one or more corresponding test modes for the base test modes (e.g., a low-speed standby mode test, a high-speed standby mode test, a low-speed startup mode test, and a high-speed startup mode test) are automatically sequentially performed. Based on the rotational speed of turbomachine 10 (e.g., of shaft 22, rotor disk 24, and/or rotor disk 28) detected in each of the base test modes, computing system 102 may identify whether any of the modes are not properly calibrated. If all of the modes are properly calibrated, computing system 102 may control hydraulic starter system 52 to perform an automatic calibration procedure for an additional mode (e.g., a medium-speed crank mode).

It should be appreciated that computing system 102 may be any suitable controller or combination of controllers and generally include control circuitry having one or more processors 104 coupled to memory 106. Processor(s) 104 can include any suitable processing device(s) (e.g., a control circuitry, a processor core, a microprocessor, an application specific integrated circuit, a field programmable gate array, a controller, a microcontroller, etc.) and can be one processor or a plurality of processors that are operatively connected. Memory 106 can include one or more non-transitory computer-readable storage media, such as RAM, ROM, EEPROM, EPROM, one or more memory devices, flash memory devices, etc., and combinations thereof. Memory 106 can store information and data 108 that can be accessed by processor(s) 104. For instance, memory 106 (e.g., one or more non-transitory computer-readable storage mediums, memory devices) can include computer-readable instructions 110 that can be executed by processor(s) 104. Instructions 110 can be software, firmware, or both written in any suitable programming language or can be implemented in firmware or hardware. Additionally, or alternatively, instructions 110 can be executed in logically and/or virtually separate threads on processor(s) 104. For example, memory 106 can store instructions 110 that when executed by processor(s) 104 cause processor(s) 104 to perform operations such as any of the operations and functions as described herein.

Computing system 102 may communicate with the various components of system 100. For instance, sensor(s) 66, and the pump motor 58, supply actuator 62, flow rate valve 64, any controllable components of hydraulic starter 50 (e.g., gearbox elements), any controllable components of turbomachine 10, and/or the like can be communicatively coupled to computing system 102. Moreover, computing system 102 may communicate with one or more user interfaces 68. User interface(s) 68 may include one or more feedback devices (not shown), such as display screens, speakers, warning lights, and/or the like. In addition, some embodiments of user interface(s) 68 may include one or more input devices (not shown), such as touchscreens, keypads, touchpads, knobs, buttons, sliders, switches, mice, microphones, and/or the like, for allowing an operator to provide inputs to computing system 102.

Computing system 102 receives data 108 from sensor(s) 66 (e.g., detected rotational speed of turbomachine 10) and from user interface(s) 68 (e.g., system configurations, requests, and/or the like), and controls (e.g., modulates) hydraulic starter system 52, user interface(s) 68, and/or the like based at least in part on such data 108. The computing system 102 may communicate with the various components of the system through a wired interface and/or a wireless interface (e.g., as illustrated with dashed lines), such as through a wireless communication mode, such as an ultra-wideband communication network (UWB), a wireless universal serial bus (USB) communication network, a communication network that implements ZigBee® of ZigBee Alliance Corporation, a general packet radio service (GPRS) network, or the like.

Computing system 102 generates command instructions that generally control operation of hydraulic starter system 52 for calibrating hydraulic starter system based on data 108 and one or more algorithms stored in instructions 110. These algorithms, for example, may enable the computing system 102 to sequentially perform different test modes to determine if hydraulic starter system 52 is properly calibrated to operate within certain predefined limits (e.g., predefined, respective speed ranges for each test mode) and/or to automatically calibrate settings of hydraulic starter system 52 for a medium-speed crank mode, with the objective of reducing chances for manual calibration errors, which improves the reliability of hydraulic starter system 52 and reduces damage potential for hydraulic starter system 52 and/or turbomachine 10.

FIGS. 3A-3H illustrate a flow diagram of a control algorithm 200 for calibrating a hydraulic starter for a turbomachine, such as hydraulic starter 50 of hydraulic starter system 52 for turbomachine 10, in accordance with aspects of the present disclosure. In general, control algorithm 200 will be described herein as being implemented by computing system 102 of system 100 described above with reference to FIG. 2. However, it should be appreciated that the various processes described below may alternatively be implemented by another computing device or any combination of computing devices. In addition, although FIGS. 3A-3H depict steps or functions performed in a particular order for purposes of illustration, the calibration routines discussed herein are not necessarily limited to any particular order or arrangement, except where explicitly stated. One skilled in the art, using the disclosures provided herein, will appreciate that the various steps or functions of the algorithms disclosed herein can be omitted, rearranged, combined, and/or adapted in various ways without deviating from the scope of the present disclosure.

Figure 3A:
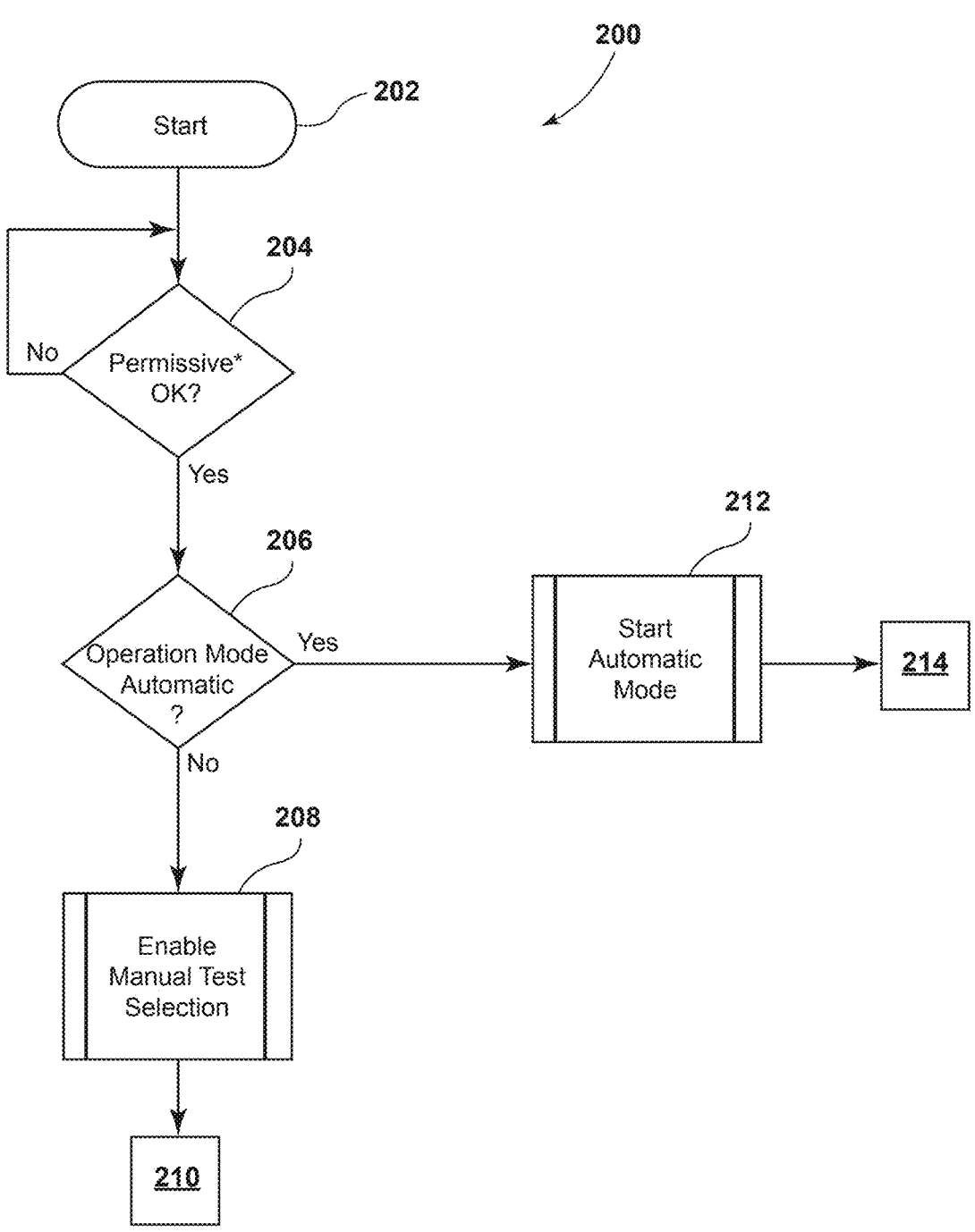
FIGS. 3A-3H illustrate a flow diagram of a control algorithm for calibrating a hydraulic starter for a turbomachine in accordance with aspects of the present disclosure.

As shown in FIG. 3A, during a calibration process started at (202), it may be determined at (204) whether there is permission to proceed with the calibration process. Particularly, it may be confirmed at (204) that the hydraulic starter 50 is stopped (e.g., if rotational speed of turbomachine 10 is substantially equal to zero), that no trips or stops are active, that flow rate valve 64 is in the fully closed position, and that hydraulic starter motor (e.g., pump motor 58) is in an automatic mode and turned off. The process waits until all the conditions at (204) are confirmed. Once all the conditions at (204) are confirmed, it is determined at (206) whether the operation mode is automatic. In one embodiment, computing system 102 receives an input at (206) via user interface(s) 68 indicative of selecting a manual mode or an automatic mode. If a manual mode is selected at (206), then the process proceeds to (208) where manual selection of base mode tests is enabled, and where a user may subsequently select one or more mode tests to be performed starting at (210). However, if an automatic mode is selected at (206), then an automatic calibration begins at (212), and the process proceeds to (214).

Figure 3B:
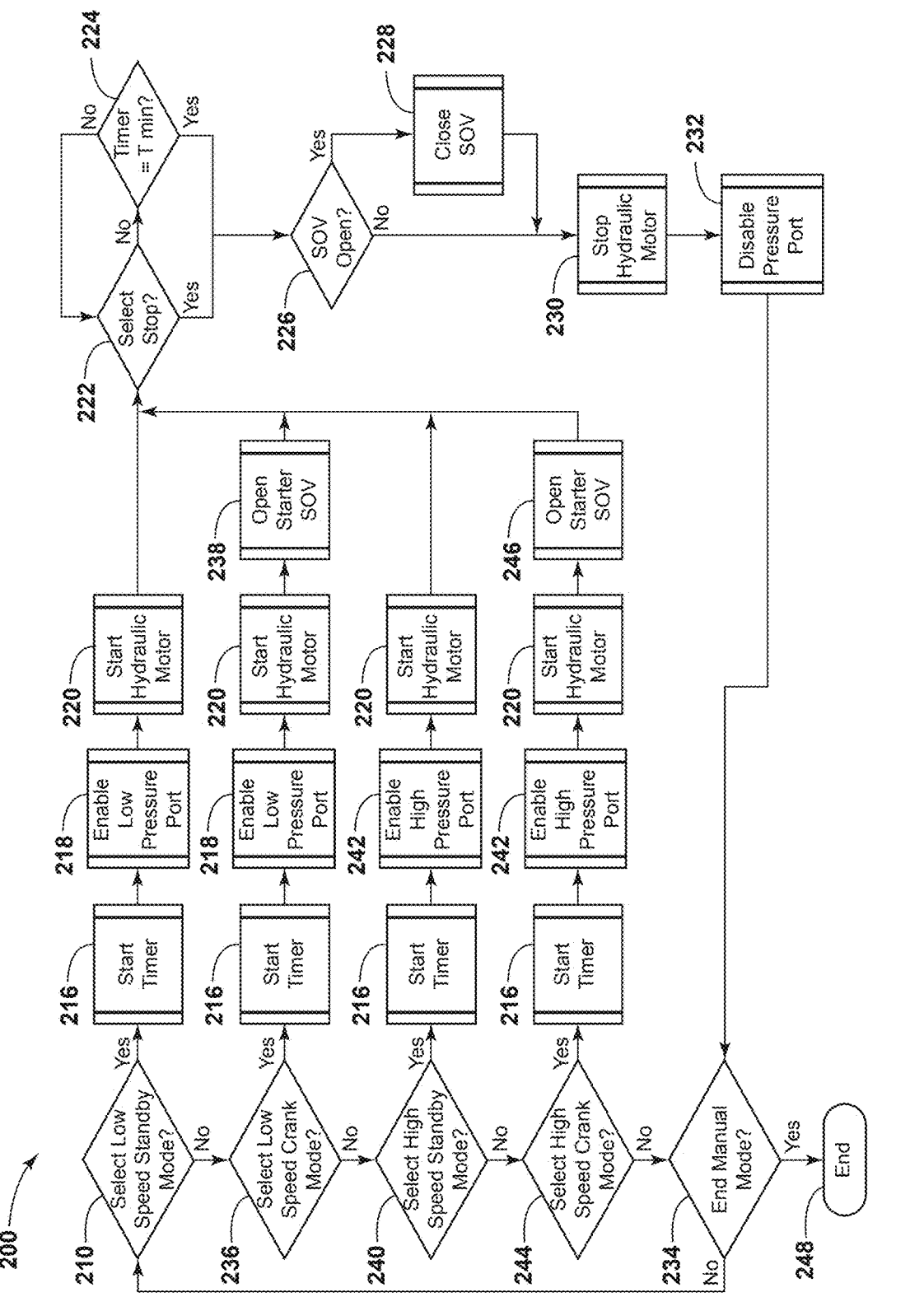

As shown in FIG. 3B, a user may generally select between different base modes to be tested. For instance, if a user selects the low-speed standby mode to be tested at (210), the computing system 102 proceeds to start a timer at (216), enable low pressure port 56L at (218) (e.g., control actuation of supply actuator 62 to select low pressure port 56L), start motor at (220) (e.g., control pump motor 58 to begin drawing fluid into pump 56). At (222), it is determined if a user has requested to stop the testing. If no input to stop the testing is received at (222), and the timer has not reached a predetermined time limit T for stopping the testing at (224), computing system 102 continues to wait for a request at (222) to stop the testing until the timer reaches predetermined time limit T at (224). In one example, predetermined time limit T at (224) may be fifteen minutes. However, predetermined time limit T at (224) may be any other suitable amount of time.

If no input to stop the testing is received at (222), and the predetermined time limit T has elapsed at (224), then computing system 102 determines if flow rate valve 64 is open at (226). If flow rate valve 64 is open at (226), computing system 102 controls flow rate valve 64 at (228) to close (e.g., controls solenoid of flow rate valve 64 to move flow rate valve 64 into the fully closed position). If flow rate valve 64 is closed at (226), or has been closed at (228), computing system 102 stops motor at (230) (e.g., controls pump motor 58 to stop drawing fluid into pump 56). At (232), the selected pressure port (e.g., low pressure port for low-pressure standby mode) is disabled by computing system 102 (e.g., actuation of supply actuator 62 is controlled to select no port for supplying fluid from pump 56). Thereafter, at (234), it is determined if manual mode is requested to end. For instance, if an operator selected multiple base modes for testing at (208), then manual mode returns to (210). If an operator only selected one base mode at (208), or otherwise requests at (234) via user interface(s) 68 to end manual selection for tests, the process ends at (248).

If low-speed standby mode is not selected for testing at (210) or was not selected as part of a group at (208), process proceeds to (236) where computing system 102 determines if a low-speed crank mode is selected. If a low-speed crank mode is selected at (236), computing system 102 performs steps (216), (218), and (220) as described above. Thereafter, computing system 102 controls flow rate valve 64 at (238) to open (e.g., controls solenoid of flow rate valve 64 to move flow rate valve 64 into the fully opened position). After opening flow rate valve 64, computing system 102 performs steps (222)-(234), as described above.

If low-speed standby mode is not selected for testing at (210) or was not selected as part of a group at (208), and if low-speed crank mode is not selected for testing at (236) or was not selected at (208), process proceeds to (240) where computing system 102 determines if a high-speed standby mode is selected for testing. If a high-speed standby mode is selected at (240), computing system 102 performs step (216) as described above, enables high pressure port 56H at (242) (e.g., controls actuation of supply actuator 62 to select high pressure port 56H for supplying fluid from pump 56), and performs step (220) as described above before performing steps (222)-(234), as described above.

If low-speed standby mode is not selected for testing at (210) or was not selected as part of a group at (208), if low-speed crank mode is not selected for testing at (236) or was not selected at (208), and if high-speed standby mode is not selected for testing at (240) or was not selected at (208), process proceeds to (244) where computing system 102 determines if a high-speed crank mode is selected for testing. If a high-speed crank mode is selected for testing at (244), computing system 102 performs steps (216), (242), and (220), as described above. Thereafter, computing system 102 controls flow rate valve 64 at (246) to open (e.g., controls solenoid of flow rate valve 64 to move flow rate valve 64 into the fully opened position). After opening flow rate valve 64, computing system 102 performs steps (222)-(234), as described above.

If low-speed standby mode is not selected for testing at (210) or was not selected as part of a group at (208), if low-speed crank mode is not selected for testing at (236) or was not selected at (208), if high-speed standby mode is not selected for testing at (240) or was not selected at (208), and high-speed crank mode is not selected for testing at (244) or was not selected at (208), it is determined at (234) that the manually selected testing mode can end, and the process ends at (248).

As particularly shown in FIGS. 3C-3H, computing system 102 may be configured to automatically control the hydraulic starter system 52 to sequentially perform different mode tests when automatic testing is started at (212) (FIG. 3A). For instance, starting in FIG. 3C, computing system 102 may start with a low-speed standby mode test at (214). Particularly, computing system 102 may start a first automatic timer at (250), enable low pressure port at (252) (e.g., control operation of supply actuator 62 to select low pressure port 56L for supplying fluid from pump 56), and start motor at (254) (e.g., control pump motor 58 to begin drawing fluid into pump 56). At (256), computing system 102 determines if the rotational speed of turbomachine 10 is within a respective speed range for the low-speed standby mode test. In general, as flow rate valve 64 is in the fully closed position at (204) (FIG. 3A), the rotational speed of turbomachine 10 (e.g., of shaft 22, rotor disk 24, and/or rotor disk 28) should be close to, or equal to, zero for standby modes. As such, the respective speed range for the low-speed standby mode test may be less than 30 rpm (revolutions per minute), however any other suitable limit may instead be used.

If the rotational speed of turbomachine 10 is outside the respective speed range for the low-speed standby mode test at (256), a warning is issued at (258) indicating that the low-speed standby mode test has failed. However, if the rotational speed of turbomachine 10 is within the respective speed range for the low-speed standby mode test at (256) and the first timer reaches a predetermined first threshold time T1 at (260), then a flag is set at (262) indicating that the low-speed standby mode test was successful and that the low-speed standby mode is properly calibrated. In some instances, predetermined first threshold time T1 is between two and ten minutes, such as about five minutes. However, it should be appreciated that any other suitable time may instead be used.

Once computing system 102 determines that low-speed standby mode test failed at (258) or succeeded at (262), computing system 202 stops motor at (264) (e.g., controls pump motor 58 to stop drawing fluid into pump 56), and starts a watchdog timer at (266). If at (268), watchdog timer has not reached a minimum watchdog time, computing system 102 determines at (270) whether hydraulic starter 50 has stopped (i.e., if the rotational speed of turbomachine 10 is below a stop threshold). The minimum watchdog time may be between two and ten minutes, such as about five minutes. However, the minimum watchdog time may be any other suitable time. Moreover, in some instances, the stop threshold may be less than 30 rpm, such as 0 rpm, or may be any other suitable speed. If the rotational speed of turbomachine 10 is not below the stop threshold (e.g., zero) at (270) before the minimum watchdog time has elapsed at (268), the automatic calibration process ends at (272). If the rotational speed of turbomachine 10 is below the stop threshold (e.g., zero) at (270) when the watchdog timer reaches the minimum watchdog time at (268), the process proceeds to (274).

Figure 3C:
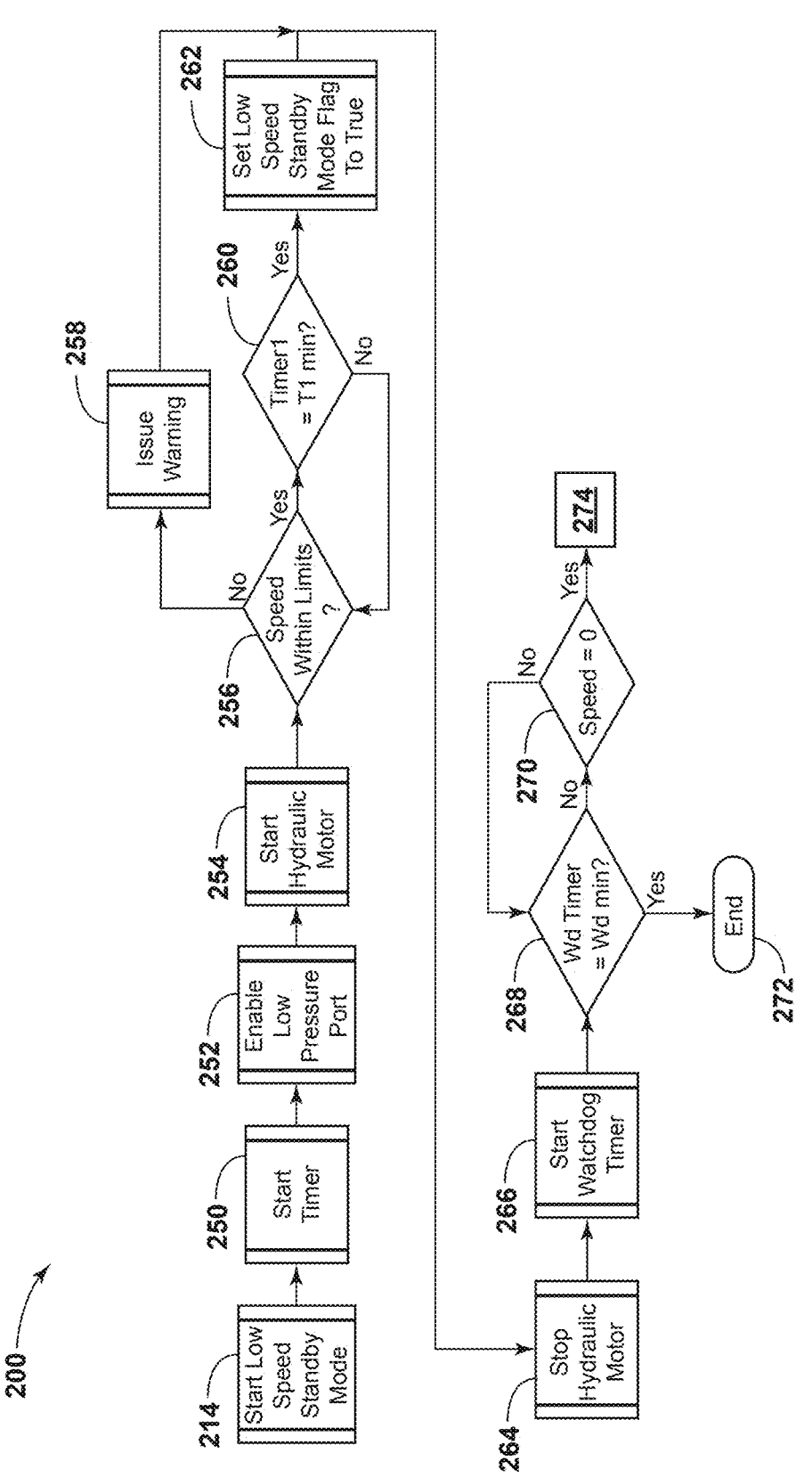
Figure 3D:
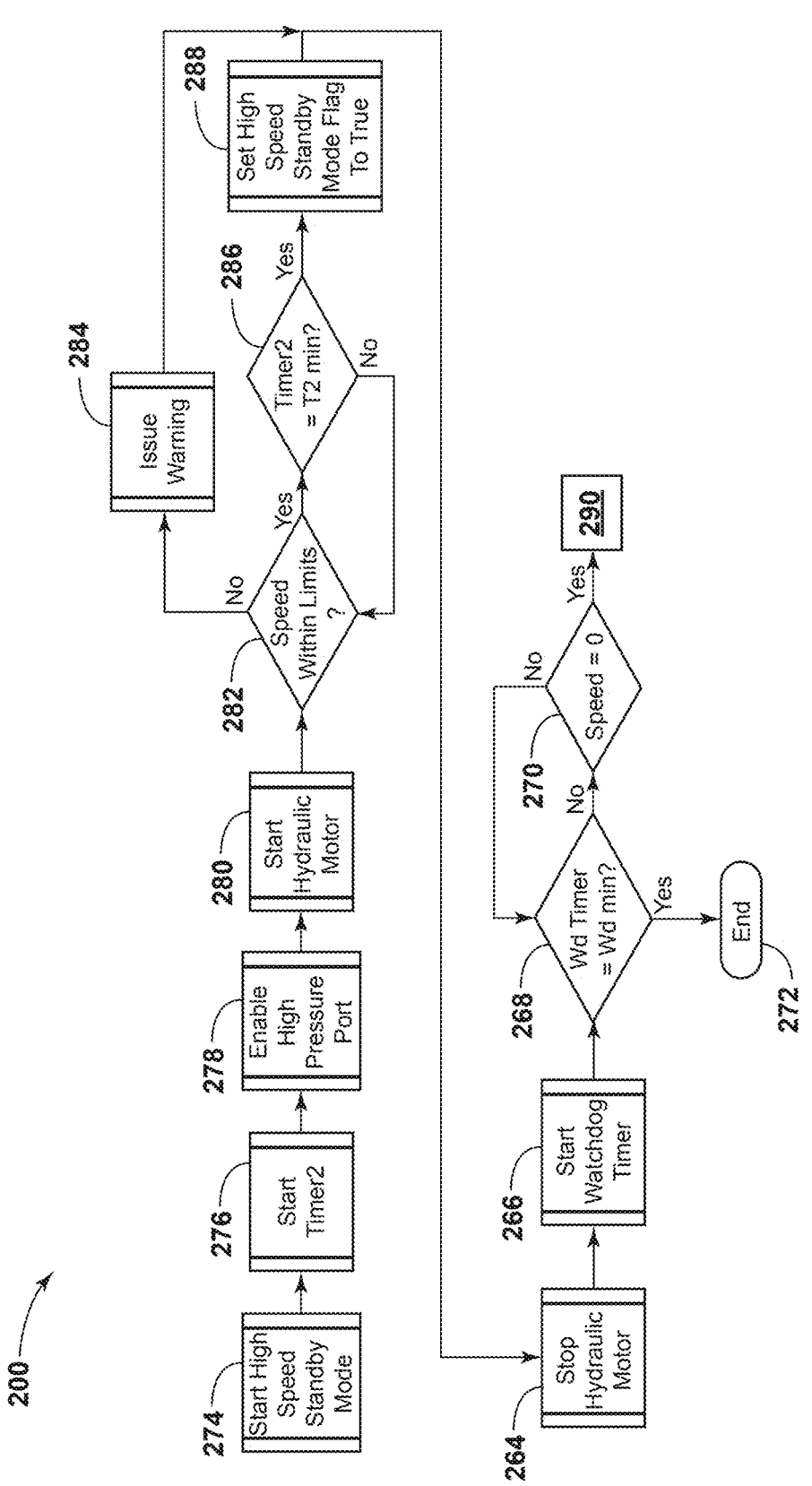

As shown in FIG. 3D, at (274), a high-speed standby mode test is initiated after performing the low-speed standby mode test. For instance, computing system 102 may start a second automatic timer at (276), enable high pressure port at (278) (e.g., control operation of supply actuator 62 to select high pressure port 56H for supplying fluid from pump 56), and start motor at (280) (e.g., control pump motor 58 to begin drawing fluid into pump 56). At (282), computing system 102 determines if the rotational speed of turbomachine 10 is within a respective speed range for the high-speed standby mode test. The respective speed range for the high-speed standby mode test may be less than 30 rpm, however any other suitable limit may instead be used. If the rotational speed of turbomachine 10 is outside the respective speed range for the high-speed standby mode test at (282), a warning is issued at (284) indicating that the high-speed standby mode test has failed. However, if the rotational speed of turbomachine 10 is within the respective speed range for the high-speed standby mode test at (282) and the second timer reaches a predetermined second threshold time T2 at (286), then a flag is set at (288) indicating that the high-speed standby mode test was successful, and that the high-speed standby mode is properly calibrated. In some instances, predetermined second threshold time T2 is between two and ten minutes, such as about five minutes.

However, it should be appreciated that any other suitable time may instead be used. Once computing system 102 determines that high-speed standby mode test failed at (284) or succeeded at (288), computing system 202 performs steps (264)-(272) as described above, but proceeds to step (290) if the rotational speed of turbomachine 10 is below the stop threshold (e.g., zero) at (270) when the watchdog timer reaches the minimum watchdog time at (268).

Figure 3E:
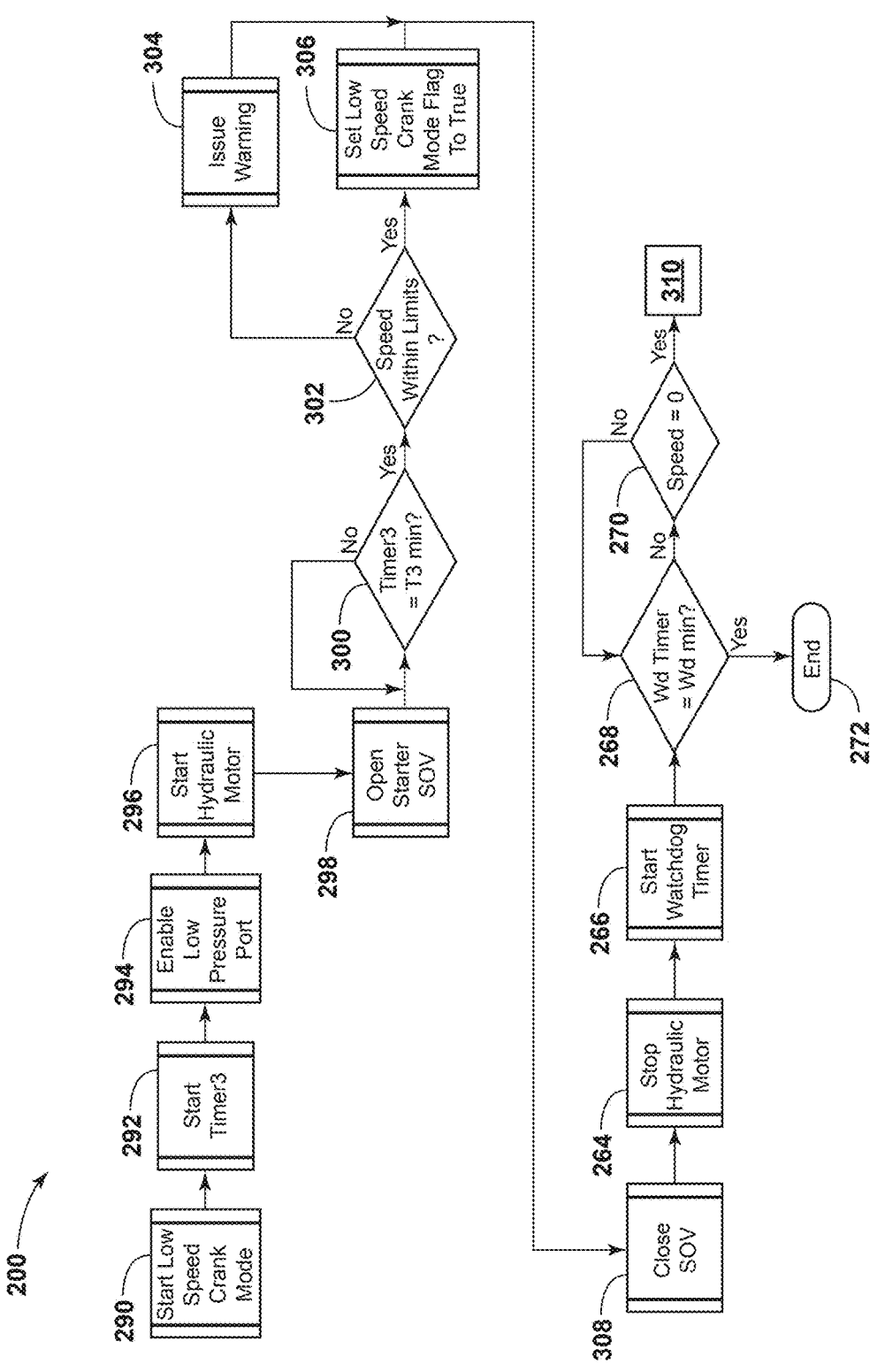

As shown in FIG. 3E, at (290), a low-speed crank mode test is initiated after performing the high-speed standby mode test. For instance, computing system 102 may start a third automatic timer at (292), enable low pressure port at (294) (e.g., control operation of supply actuator 62 to select low pressure port 56L for supplying fluid from pump 56), and start motor at (296) (e.g., control pump motor 58 to begin drawing fluid into pump 56). At (298), computing system 102 controls flow rate valve 64 to open (e.g., controls solenoid of flow rate valve 64 to move flow rate valve 64 into the fully opened position). Once the third timer reaches a third predetermined threshold time T3 at (300), computing system 102 determines if the rotational speed of turbomachine 10 is within a respective speed range for the low-speed crank mode test at (302). In some instances, predetermined third threshold time T3 is between two and ten minutes, such as about five minutes. However, it should be appreciated that any other suitable time may instead be used. Moreover, it should be appreciated that, in general, the rotational speed range for the low-speed crank mode test is above the rotational speed range for the standby modes, and may be lower than the rotational speed range for the high-speed crank test mode. For instance, the respective speed range for the low-speed crank mode test may be between 50 rpm and 150 rpm, such as between 80 rpm and 120 rpm, however any other suitable range limits may instead be used.

If the rotational speed of turbomachine 10 is outside the respective speed range for the low-speed crank mode test at (302), a warning is issued at (304) indicating that the low-speed crank mode test has failed. However, if the rotational speed of turbomachine 10 is within the respective speed range for the low-speed crank mode test at (302), then a flag is set at (306) indicating that the low-speed crank mode test was successful, and that the low-speed crank mode is properly calibrated. Once computing system 102 determines that low-speed crank mode test failed at (304) or succeeded at (306), computing system 202 controls flow rate valve 64 at (308) to close (e.g., controls solenoid of flow rate valve 64 to move flow rate valve 64 into the fully closed position), and performs steps (264)-(272) as described above, but proceeds to step (310) if the rotational speed of turbomachine 10 is below the stop threshold (e.g., zero) at (270) when the watchdog timer reaches the minimum watchdog time at (268).

Figure 3F:
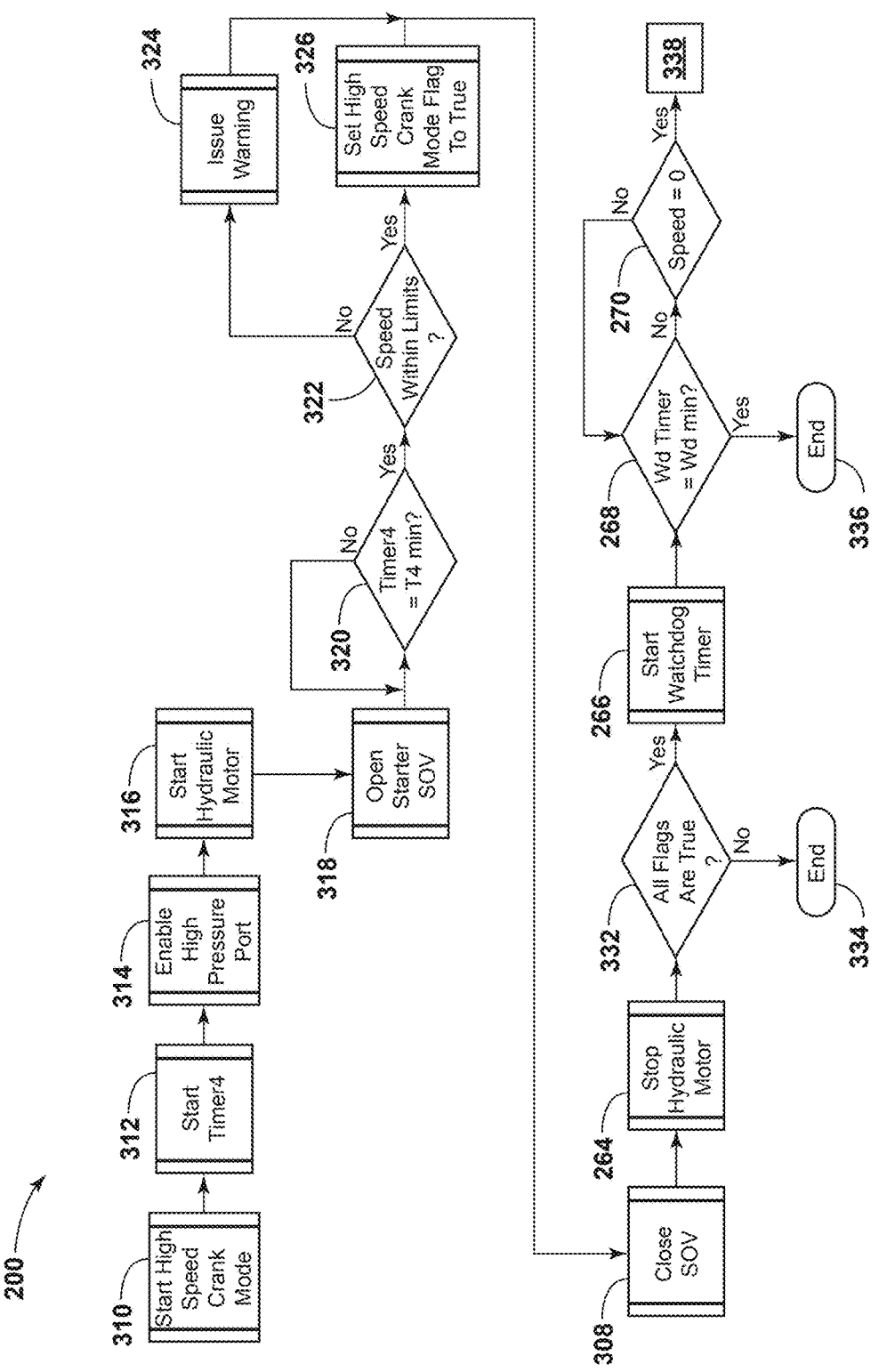

As shown in FIG. 3F, at (310), a high-speed crank mode test is initiated after performing the low-speed crank mode test. For instance, computing system 102 may start a fourth automatic timer at (312), enable high pressure port at (314) (e.g., control operation of supply actuator 62 to select high pressure port 56H for supplying fluid from pump 56), and start motor at (316) (e.g., control pump motor 58 to begin drawing fluid into pump 56). At (318), computing system 102 controls flow rate valve 64 to open (e.g., controls solenoid of flow rate valve 64 to move flow rate valve 64 into the fully opened position). Once the fourth timer reaches a fourth predetermined threshold time T4 at (320), computing system 102 determines if the rotational speed of turbomachine 10 is within a respective speed range for the high-speed crank mode test at (322). In some instances, predetermined fourth threshold time T4 is between two and ten minutes, such as about five minutes. However, it should be appreciated that any other suitable time may instead be used. The respective speed range for the high-speed crank mode test may be above 2000 rpm, such as above 2400 rpm, however any other suitable range limits may instead be used.

If the rotational speed of turbomachine 10 is outside the respective speed range for the high-speed crank mode test at (322), a warning is issued at (324) indicating that the high-speed crank mode test has failed. However, if the rotational speed of turbomachine 10 is within the respective speed range for the high-speed crank mode test at (322), then a flag is set at (326) indicating that the high-speed crank mode test was successful, and that the high-speed crank mode is properly calibrated. Once computing system 102 determines that high-speed crank mode test failed at (324) or succeeded at (326), computing system 202 performs steps (308) and (264), as described above, and determines at (332) if all flags set for the different base modes indicate success. If one or more of the flags set for the different base modes performed indicate failure at (332), then the automatic calibration process ends at (334). In some instances, at (334), computing system 102 may additionally control operation of user interface(s) 68 to indicate each of the one or more of the plurality of base modes with flags that indicated failure.

However, if all the flags set for the different base modes performed indicate success at (332), then computing system 102 proceeds with steps (266)-(270) as described above, and proceeds to step (336) if the rotational speed of turbomachine 10 is not below the stop threshold (e.g., zero) at (270) when the watchdog timer reaches the minimum watchdog time at (268), or proceeds to step (338) if the rotational speed of turbomachine 10 is below the stop threshold (e.g., zero) at (270) when the watchdog timer reaches the minimum watchdog time at (268).

Figure 3G:
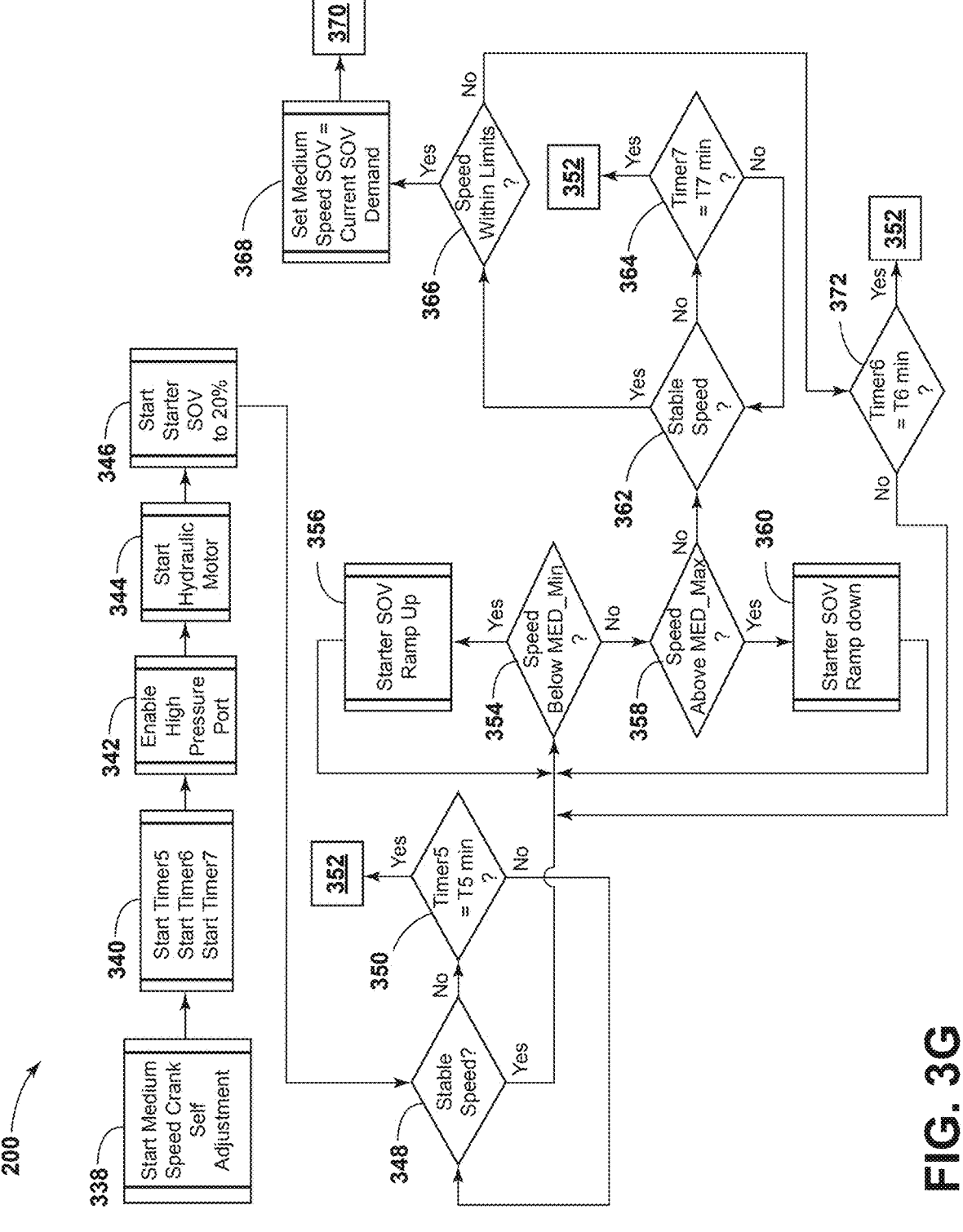

As shown in FIG. 3G, at (338), a medium-speed crank mode calibration is initiated after performing the high-speed crank mode test. For instance, computing system 102 may start a fifth automatic timer, a sixth automatic timer, and a seventh automatic timer at (340), enable high pressure port at (342) (e.g., control operation of supply actuator 62 to select high pressure port 56H for supplying fluid from pump 56), and start motor at (344) (e.g., control pump motor 58 to begin drawing fluid into pump 56). At (346), computing system 102 controls flow rate valve 64 to partially open. For instance, computing system 102 controls solenoid of flow rate valve 64 to move flow rate valve 64 into a first intermediate position between the fully opened and fully closed positions, associated with a flow rate between the highest and lowest flow rates. For example, first intermediate position may be associated with a flow rate equal to about 20% of the fully opened flow rate. After partially opening the flow rate valve 64 at (346), computing system 102 may determine if a stable rotational speed of turbomachine 10 is reached at (348) before the fifth timer reaches a predetermined fifth threshold time T5 at (350). It should be appreciated that "stable" is intended to mean having only up to a small predetermined change in rotational speed over time. In some instances, predetermined fifth threshold time T5 is between two and ten minutes. However, it should be appreciated that any other suitable time may instead be used.

If the rotational speed of turbomachine 10 is not stable at (348) when the fifth timer reaches a predetermined fifth threshold time T5, the process proceeds to (352). However, if the rotational speed of turbomachine 10 is stable at (348), the process proceeds to determining whether the rotational speed of hydraulic starter 50 is within a rotational speed range for the medium-speed crank mode. In general, the rotational speed range for the medium-speed crank mode test is above the rotational speed range for the standby modes, higher than the rotational speed range for the low-speed crank test mode, and lower than the rotational speed range for the high-speed crank test mode. For instance, the rotational speed range for the medium-speed crank mode may be between a minimum speed of about 900 rpm and a maximum speed of about 1100 rpm.

At (354), computing system 102 determines if the rotational speed of turbomachine 10 (e.g., rotational speed of shaft 22, rotor disk 24, and/or rotor disk 28) is below the minimum speed of the medium-speed range. If the rotational speed of turbomachine 10 is below the minimum speed of the medium-speed range at (354), computing system 102 is configured to control the flow rate valve 64 to open further at a given rate or interval at (356) and recheck the rotational speed of turbomachine 10 at (354) until the rotational speed of turbomachine 10 at (354) is above the minimum speed of the medium-speed range. For instance, computing system 102 controls solenoid of flow rate valve 64 to move flow rate valve 64 from the first intermediate position towards the fully opened position at the given ramp-up rate. The ramp-up rate may be between 0.3% and 2% (of the distance between the fully closed and fully opened valve positions) per second, such as at about 1% per second.

If the rotational speed of turbomachine 10 is above the minimum speed of the medium-speed range at (354), computing system 102 determines, at (358), if the rotational speed of turbomachine 10 (e.g., rotational speed of shaft 22, rotor disk 24, and/or rotor disk 28) is above the maximum speed of the medium-speed range. If the rotational speed of turbomachine 10 is above the maximum speed of the medium-speed range at (358), computing system 102 is configured to control the flow rate valve 64 to close further at a given rate or interval at (360) and return to (354), until the rotational speed of turbomachine 10 is both above the minimum speed of the medium-speed range at (354) and is below the maximum speed of the medium-speed range at (358). For instance, computing system 102 controls solenoid of flow rate valve 64 to move flow rate valve 64 (e.g., from the first intermediate position) towards the fully closed position at the given ramp-down rate. The ramp-down rate may be between 0.3% and 2% (of the distance between the fully closed and fully opened valve positions) per second, such as at about 1% per second.

Once the rotational speed of turbomachine 10 is below the maximum speed of the medium-speed range at (358), computing system 102 determines if the rotational speed of turbomachine 10 (e.g., rotational speed of shaft 22, rotor disk 24, and/or rotor disk 28) is stable at (362). It should be appreciated that "stable" is again intended to mean having only up to a small predetermined change in rotational speed over time. If the rotational speed of turbomachine 10 is not stable at (362) and seventh timer reaches a predetermined seventh threshold time T7 at (364), process proceeds to (352). In some instances, predetermined seventh threshold time T7 is between two and ten minutes. However, it should be appreciated that any other suitable time may instead be used.

If the rotational speed of turbomachine 10 is stable at (362), computing system 102 determines if the rotational speed of turbomachine 10 is still within the rotational speed range for the medium-speed crank mode at (366). If the rotational speed of turbomachine 10 is still within the rotational speed range for the medium-speed crank mode at (366), the current opening position of the flow rate valve 64 is set at (368) as the medium-speed crank mode position of the flow rate valve 64 for performing medium-speed crank modes with turbomachine 10, and the process proceeds to (370). However, if the rotational speed of turbomachine 10 is not still within the rotational speed range for the medium-speed crank mode at (366), and the sixth timer reaches a predetermined sixth threshold time T6 at (372), process proceeds to (352). If the rotational speed of turbomachine 10 is not still within the rotational speed range for the medium-speed crank mode at (366), and the sixth timer has not reached predetermined sixth threshold time T6 at (372), process returns to (354). In some instances, predetermined sixth threshold time T6 is between ten and twenty minutes, such as about fifteen minutes. However, it should be appreciated that any other suitable time may instead be used.

Figure 3H:
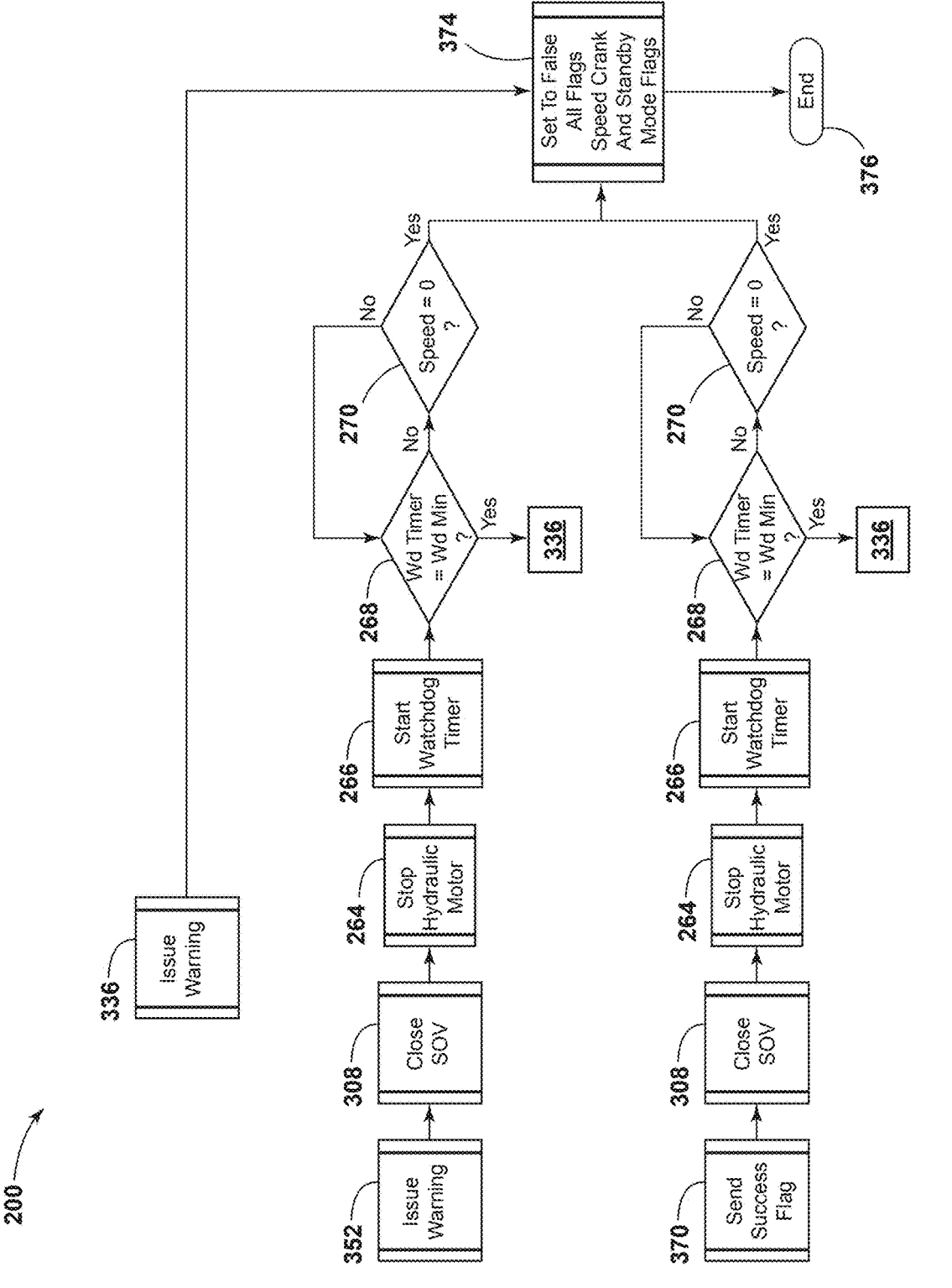

In FIG. 3H, once all eligible conditions have been tested, the automatic calibration process comes to an end. For instance, at (336), if all the flags set for the different base modes performed indicated success at (332) in FIG. 3F and the rotational speed of turbomachine 10 was not below the stop threshold (e.g., zero) at (270) in FIG. 3F, a warning is issued at (336) indicating that there is a problem stopping the turbomachine 10 during the performed modes. At (374), all of the flags in the calibration process are re-set for the next calibration process, then at (376) the calibration process is ended.

Similarly, if the rotational speed of turbomachine 10 is not stabilized at (350) or (364) in FIG. 3G or is not within limits by (372) in FIG. 3G, a warning is issued at (352) in FIG. 3F indicating that a problem with the medium-speed crank calibration occurred. Moreover, computing system 202 controls flow rate valve 64 at (308) to close (e.g., controls solenoid of flow rate valve 64 to move flow rate valve 64 into the fully closed position), performs steps (264)-(270) as described above, and proceeds to step (374) if the rotational speed of turbomachine 10 is below the stop threshold (e.g., zero) at (270) when the watchdog timer reaches the minimum watchdog time at (268) or proceeds to step (336) if the rotational speed of turbomachine 10 is not below the stop threshold (e.g., zero) at (270) when the watchdog timer reaches the minimum watchdog time at (268).

Finally, if the medium-speed crank mode position of the flow rate valve 64 is successfully set at (368) in FIG. 3G, a flag is set by computing system 102 at (370) indicating that the medium-speed crank mode calibration was successful, and that the medium-speed crank mode is properly calibrated. Thereafter, computing system 202 controls flow rate valve 64 at (308) to close (e.g., controls solenoid of flow rate valve 64 to move flow rate valve 64 into the fully closed position), and performs steps (264)-(270) as described above, but proceeds to step (374) if the rotational speed of turbomachine 10 is below the stop threshold (e.g., zero) at (270) when the watchdog timer reaches the minimum watchdog time at (268) or proceeds to step (336) if the rotational speed of turbomachine 10 is not below the stop threshold (e.g., zero) at (270) when the watchdog timer reaches the minimum watchdog time at (268).

It should be appreciated that with notification of each failed mode test (e.g., at (258) in FIG. 3C, at (284) in FIG. 3D, at (304) in FIG. 3E, at (324) in FIG. 3F, at (336) in FIG. 3H, and/or at (352) in FIG. 3H), computing system 102 may additionally provide recommendations to facilitate troubleshooting of each specific failed mode test. Moreover, an operator may end the automatic calibration process at any time. For instance, if a failure flag is issued (e.g., at (258) in FIG. 3C, at (284) in FIG. 3D, at (304) in FIG. 3E, at (324) in FIG. 3F, at (336) in FIG. 3H, and/or at (352) in FIG. 3H), an operator may input a request to stop (e.g., via user interface(s) 68) the calibration process. After notification of failure flag(s), a user may select the manual mode at (206) in FIG. 3A for troubleshooting the failure modes flagged. In some instances, manual mode selection at (206) may only be provided if the automatic calibration run was at least partially performed.

It should additionally be appreciated that the automatic diagnostic run set forth by algorithm 200 has computing system 102 perform the low-speed standby mode, the high-speed standby mode after performing the low-speed standby mode, the low-speed crank mode after performing the high-speed standby mode, and the high-speed crank mode after performing the low-speed crank mode and before performing the medium-speed crank calibration mode. As the potential rotational speed is lowest with the low-speed standby mode and increases with each mode of such sequence, such sequence has the lowest risk of causing damage, as the test may be stopped by the operator if there are issues in the lower risk modes before proceeding to the higher risk modes. However, other suitable patterns may instead be used before performing the medium-speed crank calibration mode. For instance, in one embodiment, the low-speed base modes may be performed before the high-speed base modes. In another embodiment, the high-speed base modes be performed before the low-speed base modes.

Figure 4A:
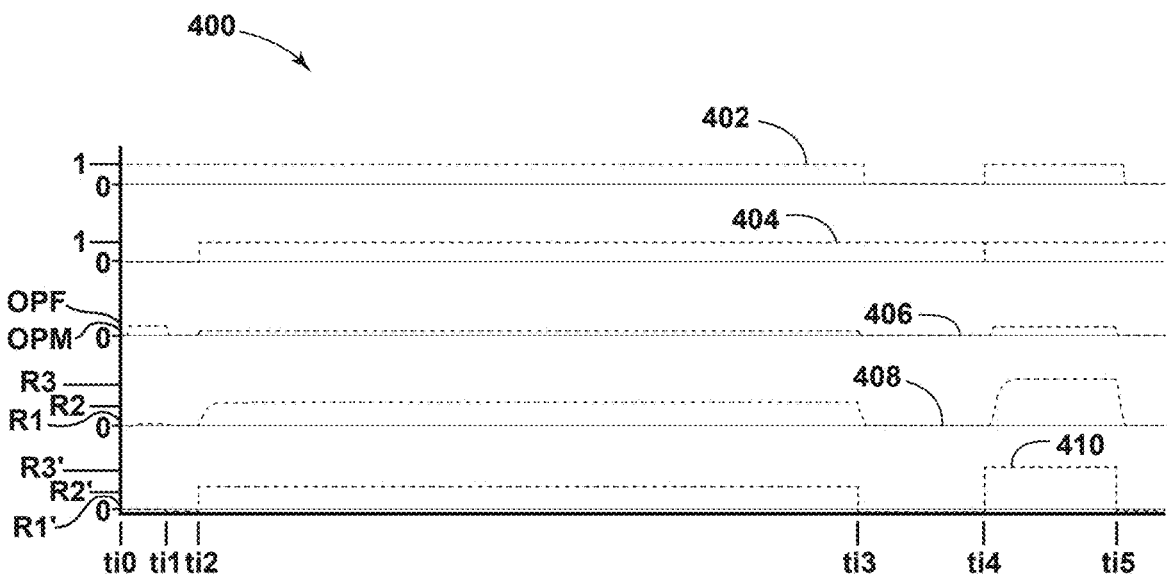
FIGS. 4A and 4B illustrate examples of data for calibrated hydraulic starter components during different operating modes of the hydraulic starter in accordance with aspects of the present disclosure.
Figure 4B:
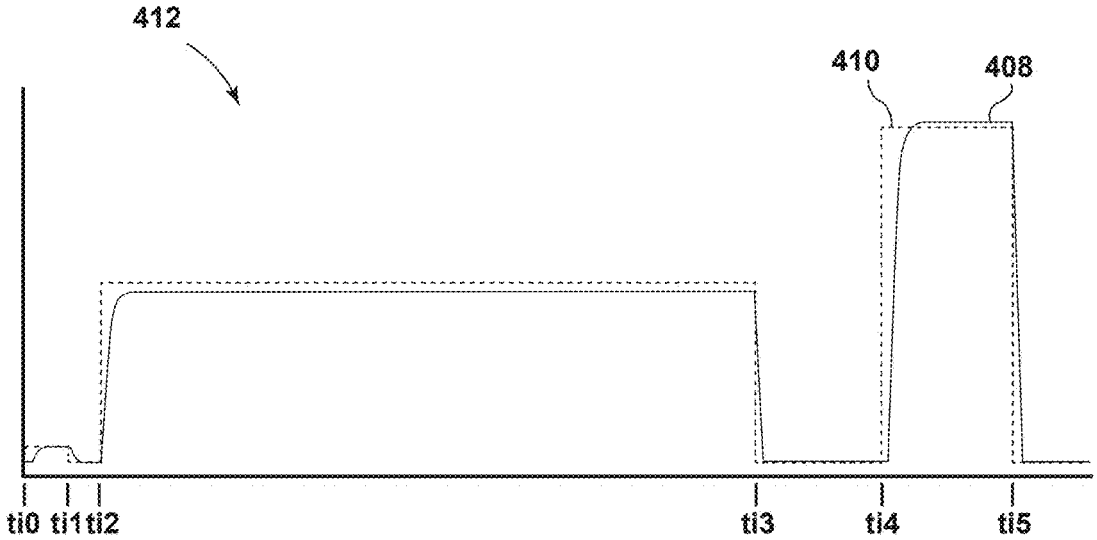

FIGS. 4A and 4B illustrate examples of data for calibrated hydraulic starter components during different operating modes of the hydraulic starter in accordance with aspects of the present disclosure. For instance, in FIG. 4A, the graph 400 illustrates operation of pump motor 58 with plot 402, position of supply actuator 62 with plot 404, position of flow rate valve 64 with plot 406, detected rotational speed of turbomachine 10 with plot 408, and requested rotational speed of turbomachine 10 with plot 410 across a plurality of operating modes of hydraulic starter 50. FIG. 4B shows a plot 412 of the detected rotational speed of turbomachine 10 with plot 408 with respect to the requested rotational speed of turbomachine 10 with plot 410 across the plurality of operating modes of hydraulic starter 50.

In FIGS. 4A and 4B, the plurality of operating modes includes a low-speed crank mode extends between starting time ti0 and first time ti1, a low-speed standby mode extends between first time ti1 and second time ti2, a medium-speed crank mode extends between second time ti2 and third time ti3, a high-speed standby mode extends between third time ti3 and fourth time ti4, and a high-speed crank mode extends between fourth time ti4 and fifth time ti5. For pump motor 58, the pump motor 58 is off when plot 402 is at a value of zero, and the pump motor 58 is on when plot 402 is at a value of one. Similarly, for supply actuator 62, the supply actuator 62 supplies fluid through the low pressure port 56L when plot 404 is at value of zero, and the supply actuator 62 supplies fluid through the high pressure port 56H when plot 404 is at value of one. Flow rate valve 64 is in the fully opened position when plot 406 is at value OPF, in the fully closed position when plot 406 is at a value of zero, and is in the medium-crank position when plot 406 is at value OPM.

During the low-speed crank mode between starting time ti0 and first time ti1, pump motor 58 is controlled to begin operating (e.g., plot 402 moves from zero to one), supply actuator 62 supplies fluid through the low pressure port 56L, and flow rate valve 64 is moved into the fully opened position (e.g., plot 406 moves from zero to OPF). As a result, the detected rotational speed of turbomachine 10 increases from zero to a first rotational speed R1 in plot 408, which substantially matches a requested rotational speed R1' of turbomachine 10 in plot 410 for low-speed crank mode (e.g., about 100 rpm).

During the low-speed standby mode between first and second times ti1, ti2, pump motor 58 is controlled to continue operating, supply actuator 62 continues supplying fluid through the low pressure port 56L, and flow rate valve 64 is moved into the fully closed position (e.g., plot 406 moves from OPF to zero). As a result, the detected rotational speed of turbomachine 10 decreases from the first rotational speed R1 to approximately zero in plot 408, which substantially matches a requested rotational speed for turbomachine 10 in plot 410 during low-speed standby mode (e.g., about 0 rpm).

During the medium-speed crank mode between second and third times ti2, ti3, pump motor 58 is controlled to continue operating, supply actuator 62 is controlled to supply fluid through the high pressure port 56H, and flow rate valve 64 is moved into the medium-crank position to partially open (e.g., plot 406 moves from zero to OPM). As a result, the detected rotational speed of turbomachine 10 increases from zero to the second rotational speed R2 in plot 408, which substantially matches a requested second rotational speed R2' for turbomachine 10 in plot 410 during medium-speed crank mode (e.g., between 800 rpm and 1200 rpm, such as about 1200 rpm).

During the high-speed standby mode between third and fourth times ti3, ti4, pump motor 58 is controlled to stop operating, supply actuator 62 continues to select the high pressure port 56H, and flow rate valve 64 is moved into the fully closed position (e.g., plot 406 moves from OPM to zero). As a result, the detected rotational speed of turbomachine 10 decreases from the second rotational speed R2 to approximately zero in plot 408, which substantially matches a requested rotational speed for turbomachine 10 in plot 410 during high-speed standby mode (e.g., about 0 rpm).

During the high-speed crank mode between fourth and fifth times ti4, ti5, pump motor 58 is controlled to operate again, supply actuator 62 is controlled to supply fluid through the high pressure port 56H, and flow rate valve 64 is moved into the fully opened position (e.g., plot 406 moves from zero to OPF). As a result, the detected rotational speed of turbomachine 10 increases from zero to the third rotational speed R3 in plot 408, which substantially matches a requested third rotational speed R3' for turbomachine 10 in plot 410 during high-speed crank mode (e.g., about 2450 rpm).

FIG. 5 illustrates a flow diagram of one method 500 for calibrating a hydraulic starter for a turbomachine in accordance with aspects of the present disclosure. In general, method 500 will be described herein as being implemented by computing system 102 of system 100 described above with reference to FIG. 2 in accordance with control algorithm 200 described with reference to FIGS. 3A-3H. However, it should be appreciated that the various processes described below may alternatively be implemented by another computing device or any combination of computing devices. In addition, although FIG. 5 depicts steps or functions performed in a particular order for purposes of illustration, the method steps discussed herein are not necessarily limited to any particular order or arrangement, except where explicitly stated. One skilled in the art, using the disclosures provided herein, will appreciate that the various steps or functions of the method disclosed herein can be omitted, rearranged, combined, and/or adapted in various ways without deviating from the scope of the present disclosure.

As shown in FIG. 5, method 500 may include, at (502), receiving a request to perform an automatic diagnostic run of a hydraulic starter for a turbomachine. For instance, as discussed above, an operator may input a request via user interface(s) 68 for computing system 102 to begin an automatic diagnostic run of hydraulic starter 50 for turbomachine 10.

Further, at (504), method 500 may include controlling a hydraulic fluid source and operation of a valve coupled between the hydraulic fluid source and the hydraulic starter to perform the automatic diagnostic run including sequentially performing a plurality of base modes including at least one standby mode test and at least one crank speed mode test. For instance, as described above, computing system 102 may control hydraulic fluid source 54 (e.g., pump motor 58 and supply actuator 62) and operation of flow rate valve 64 to perform the automatic diagnostic run, where the automatic diagnostic run includes sequentially performing a plurality of base modes, the plurality of base modes including at least one standby mode test (e.g., low-speed standby mode or high-speed standby mode) and at least one crank speed mode test (e.g., low-speed crank mode or high-speed crank mode).

Additionally, at (506), method 500 may include monitoring a rotational speed of the turbomachine detected by a speed sensor during each of the plurality of base modes. For instance, as discussed above, computing system 102 may monitor a rotational speed of turbomachine 10 (e.g., rotational speed of shaft 22, rotor disk 24, and/or rotor disk) detected by speed sensor 66 during each of the plurality of base modes. The computing system 102 automatically sequentially performing the base modes while monitoring the rotational speed of turbomachine 10, as disclosed herein, makes it easier to diagnose faulty modes and reduces damage potential for hydraulic starter system 52 and/or turbomachine 10.

FIG. 6 illustrates a flow diagram of a further method 600 for calibrating a hydraulic starter for a turbomachine in accordance with aspects of the present disclosure. In general, method 600 will be described herein as being implemented by computing system 102 of system 100 described above with reference to FIG. 2 in accordance with control algorithm 200 described with reference to FIGS. 3A-3H. However, it should be appreciated that the various processes described below may alternatively be implemented by another computing device or any combination of computing devices. In addition, although FIG. 6 depicts steps or functions performed in a particular order for purposes of illustration, the method steps discussed herein are not necessarily limited to any particular order or arrangement, except where explicitly stated. One skilled in the art, using the disclosures provided herein, will appreciate that the various steps or functions of the method disclosed herein can be omitted, rearranged, combined, and/or adapted in various ways without deviating from the scope of the present disclosure.

As shown in FIG. 6, method 600 may include, at (602), controlling a hydraulic fluid source and operation of a valve coupled between the hydraulic fluid source and a hydraulic starter to sequentially perform a standby mode test and a crank speed mode test. For instance, as described above, computing system 102 may control hydraulic fluid source 54 (e.g., pump motor 58 and supply actuator 62) and operation of flow rate valve 64 to sequentially perform a standby mode test (e.g., low-speed standby mode and/or high-speed standby mode) and a crank speed mode test (e.g., low-speed crank mode and/or high-speed crank mode).

Further, at (604), method 600 may include monitoring a standby rotational speed of the turbomachine detected by a speed sensor during the standby mode test and a crank rotational speed of the turbomachine detected during the crank speed mode test. For instance, as discussed above, computing system 102 may monitor a standby rotational speed of turbomachine 10 (e.g., rotational speed of shaft 22, rotor disk 24, and/or rotor disk 28) detected by speed sensor 66 during the standby mode test and a crank rotational speed of turbomachine 10 (e.g., rotational speed of shaft 22, rotor disk 24, and/or rotor disk 28) detected by speed sensor 66 during the crank speed mode test.

Additionally, at (606), method 600 may include controlling the hydraulic fluid source and the operation of the valve to perform a medium-speed crank calibration to determine a medium-speed crank position of the valve when the standby rotational speed is within a standby speed range and the crank rotational speed is within a crank speed range. For instance, as discussed above, when the standby rotational speed is within a standby speed range (e.g., at (262) in FIG. 3C and/or at (288) in FIG. 3D) and the crank rotational speed is within a crank speed range (e.g., at (306) in FIG. 3E and/or at (326) in FIG. 3F), computing system 102 may control hydraulic fluid source 54 (e.g., pump motor 58 and supply actuator 62) and operation of flow rate valve 64 to perform a medium-speed crank calibration (e.g., at (338) in FIG. 3G) to determine a medium-speed crank position OPM of flow rate valve 64 (e.g., at (368) in FIG. 3G). By computing system 102 automatically performing the medium-speed crank calibration, user error is significantly reduced or completely removed from the calibration process, which reduces damage potential for hydraulic starter system 52 and/or turbomachine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A system for calibrating hydraulic starters for turbomachines. The system includes a hydraulic fluid source operable to supply a fluid at a high pressure or at a low pressure. The system further includes a hydraulic starter rotatably driven by the fluid from the hydraulic fluid source. Further, the system includes a flow rate valve fluidly coupled between the hydraulic fluid source and the hydraulic starter, with the flow rate valve being movable between a plurality of positions including a fully closed position and a fully opened position to adjust a flow rate of the fluid supplied from the hydraulic fluid source to the hydraulic starter. The flow rate is a lowest rate when the flow rate valve is in the fully closed position, and the flow rate is a highest rate when the flow rate valve is in the fully opened position. Moreover, the system includes a speed sensor configured to detect a rotational speed of the turbomachine. Additionally, the system includes a computing system. The computing system is configured to receive a request to perform an automatic diagnostic run of the hydraulic starter. The computing system is further configured to control the hydraulic fluid source and operation of the flow rate valve to perform the automatic diagnostic run based at least in part on the request. The automatic diagnostic run includes automatically sequentially performing a plurality of base modes, where the flow rate valve being in either the fully closed position or the fully opened position in the plurality of base modes. The plurality of base modes includes at least one standby mode test and at least one crank speed mode test, where the flow rate valve is in the fully closed position for each of the at least one standby mode test, and where the flow rate valve is in the fully opened position for each of the at least one crank speed mode test. Additionally, the computing system is configured to monitor the rotational speed of the turbomachine during each of the plurality of base modes.

The system of one or more of these clauses, wherein the at least one standby mode test includes one or more of a low-speed standby mode or a high-speed standby mode, with the hydraulic fluid source being configured to supply the fluid at the low pressure and the flow rate valve being in the fully closed position for the low-speed standby mode, and with the hydraulic fluid source being configured to supply the fluid at the high pressure and the flow rate valve being in the fully closed position for the high-speed standby mode. The at least one crank speed mode test includes one or more of a low-speed crank mode or a high-speed crank mode, with the hydraulic fluid source being configured to supply the fluid at the low pressure and the flow rate valve being in the fully opened position for the low-speed crank mode, and with the hydraulic fluid source being configured to supply the fluid at the high pressure and the flow rate valve being in the fully opened position for the high-speed crank mode.

The system of one or more of these clauses, wherein the computing system is configured to control the hydraulic fluid source and the flow rate valve to perform the automatic diagnostic run by automatically controlling the hydraulic fluid source and the flow rate valve to perform the low-speed standby mode, the high-speed standby mode after performing the low-speed standby mode, the low-speed crank mode after performing the high-speed standby mode, and the high-speed crank mode after performing the low-speed crank mode.

The system of one or more of these clauses, wherein, when the rotational speed of the turbomachine detected by the speed sensor in each of the plurality of base modes is within a respective speed range, the computing system is configured to automatically perform a medium-speed crank calibration with the computing system being configured to control the hydraulic fluid source to supply the fluid at the high pressure. The computing system being further configured to control the operation of the flow rate valve to move the flow rate valve into a first position of the plurality of positions, where the flow rate of the fluid supplied from the hydraulic fluid source to the hydraulic starter is a first rate when the flow rate valve is in the first position, with the first rate being between the lowest rate and the highest rate. The computing system being additionally configured to control the operation of the flow rate valve to move the flow rate valve from the first position at a given rate to adjust the flow rate until the rotational speed of the turbomachine is within a medium-speed range for the medium-speed crank calibration.

The system of one or more of these clauses, wherein the computing system is further configured to set a medium-speed crank position of the flow rate valve as a position of the plurality of positions of the flow rate valve when the rotational speed of the turbomachine is within the medium-speed range during the medium-speed crank calibration.

The system of one or more of these clauses, wherein the computing system is further configured to control an operation of a user interface to indicate that the medium-speed crank calibration failed when the rotational speed of the turbomachine detected by the speed sensor in the medium-speed crank calibration is not within the medium-speed range before the flow rate valve is in the fully opened position.

The system of one or more of these clauses, wherein, when the rotational speed of the turbomachine detected by the speed sensor in one or more of the plurality of base modes is outside a respective speed range after a threshold time has elapsed, the computing system is further configured to control an operation of a user interface to indicate each of the one or more of the plurality of base modes.

The system of one or more of these clauses, wherein the hydraulic fluid source has a high pressure port for supplying the fluid at the high pressure and a low pressure port for supplying the fluid at the low pressure, the hydraulic fluid source further including a supply actuator actuatable to direct fluid through the high pressure port or the low pressure port of the hydraulic fluid source.

A method for calibrating a hydraulic starter for a turbomachine, where a hydraulic fluid source is operable to supply a fluid at a high pressure or at a low pressure for rotatably driving the hydraulic starter, and where a flow rate valve is fluidly coupled between the hydraulic fluid source and the hydraulic starter. The flow rate valve is movable between a plurality of positions including a fully closed position and a fully opened position to adjust a flow rate of the fluid supplied from the hydraulic fluid source to the hydraulic starter, with the flow rate being a lowest rate when the flow rate valve is in the fully closed position, and with the flow rate being a highest rate when the flow rate valve is in the fully opened position. The method includes receiving, by a computing system, a request to perform an automatic diagnostic run of the hydraulic starter. The method further includes controlling, automatically by the computing system, the hydraulic fluid source and operation of the flow rate valve to perform the automatic diagnostic run based at least in part on the request. The automatic diagnostic run includes sequentially performing a plurality of base modes, with the flow rate valve being in either the fully closed position or the fully opened position in the plurality of base modes. The plurality of base modes including at least one standby mode test and at least one crank speed mode test, where the flow rate valve is in the fully closed position for each of the at least one standby mode test, and the flow rate valve is in the fully opened position for each of the at least one crank speed mode test. Additionally, the method includes monitoring, by the computing system, a rotational speed of the turbomachine detected by a speed sensor during each of the plurality of base modes.

The method of one or more of the above method clauses, wherein the at least one standby mode test includes one or more of a low-speed standby mode or a high-speed standby mode, with the hydraulic fluid source being configured to supply the fluid at the low pressure and the flow rate valve being in the fully closed position for the low-speed standby mode, and with the hydraulic fluid source being configured to supply the fluid at the high pressure and the flow rate valve being in the fully closed position for the high-speed standby mode. The at least one crank speed mode test includes one or more of a low-speed crank mode or a high-speed crank mode, with the hydraulic fluid source being configured to supply the fluid at the low pressure and the flow rate valve being in the fully opened position for the low-speed crank mode, and with the hydraulic fluid source being configured to supply the fluid at the high pressure and the flow rate valve being in the fully opened position for the high-speed crank mode.

The method of one or more of the above method clauses, wherein controlling the hydraulic fluid source and the flow rate valve to perform the automatic diagnostic run includes automatically controlling the hydraulic fluid source and the flow rate valve to perform the low-speed standby mode, the high-speed standby mode after performing the low-speed standby mode, the low-speed crank mode after performing the high-speed standby mode, and the high-speed crank mode after performing the low-speed crank mode.

The method of one or more of the above method clauses, wherein, when the rotational speed of the turbomachine in each of the plurality of base modes is within a respective speed range, the method further includes automatically performing a medium-speed crank calibration by controlling, by the computing system, the hydraulic fluid source to supply the fluid at the high pressure, controlling, by the computing system, the operation of the flow rate valve to move the flow rate valve into a first position of the plurality of positions, where the flow rate of the fluid supplied from the hydraulic fluid source to the hydraulic starter is a first rate when the flow rate valve is in the first position, with the first rate being between the lowest rate and the highest rate, and controlling, by the computing system, the operation of the flow rate valve to move the flow rate valve from the first position at a given rate to adjust the flow rate until the rotational speed of the turbomachine is within a medium-speed range for the medium-speed crank calibration.

The method of one or more of the above method clauses, wherein the medium-speed crank calibration further includes determining, by the computing system, a medium-speed crank position of the flow rate valve as a position of the plurality of positions of the flow rate valve when the rotational speed of the turbomachine is within the medium-speed range.

The method of one or more of the above method clauses, wherein the medium-speed crank calibration further includes controlling, by the computing system, an operation of a user interface to indicate that the medium-speed crank calibration failed when the rotational speed of the turbomachine detected in the medium-speed crank calibration is not within the medium-speed range before the flow rate valve is in the fully opened position.

The method of one or more of the above method clauses, wherein, after the medium-speed crank calibration, the method further includes controlling, by the computing system, the hydraulic fluid source to stop supplying the fluid and the operation of the flow rate valve to move the flow rate valve into the fully closed position. The method further includes controlling, by the computing system, an operation of a user interface to indicate an error when the rotational speed of the turbomachine is above a stop threshold when a threshold time has elapsed after the hydraulic fluid source is controlled to stop supplying the fluid.

The method of one or more of the above method clauses, wherein, when the rotational speed of the turbomachine detected in one or more of the plurality of base modes is outside a respective speed range, the method further includes controlling, by the computing system, an operation of a user interface to indicate each of the one or more of the plurality of base modes.

The method of one or more of the above method clauses, wherein the hydraulic fluid source has a high pressure port for supplying the fluid at the high pressure and a low pressure port for supplying the fluid at the low pressure. Controlling the hydraulic fluid source and the flow rate valve to perform the automatic diagnostic run includes controlling a supply actuator of the hydraulic fluid source, the supply actuator being controllable to direct fluid through the high pressure port or the low pressure port of the hydraulic fluid source.

The method of one or more of the above method clauses, further including controlling, by the computing system, the hydraulic fluid source to stop supplying the fluid after each of the plurality of base modes. The method further including controlling, by the computing system, an operation of a user interface to indicate an error when the rotational speed of the turbomachine is above a stop threshold when a threshold time has elapsed after the hydraulic fluid source is controlled to stop supplying the fluid.

The method of one or more of the above method clauses, further including controlling, by the computing system, the hydraulic fluid source and the flow rate valve to stop automatically sequentially performing the plurality of base modes when the rotational speed of the turbomachine is above the stop threshold when the threshold time has elapsed after the hydraulic fluid source is controlled to stop supplying the fluid.

A method for calibrating a hydraulic starter for a turbomachine, where a hydraulic fluid source is operable to supply a fluid at a high pressure or at a low pressure for rotatably driving the hydraulic starter, and where a flow rate valve is fluidly coupled between the hydraulic fluid source and the hydraulic starter. The flow rate valve is movable to adjust a flow rate of the fluid supplied from the hydraulic fluid source to the hydraulic starter, with the flow rate being a lowest rate when the flow rate valve is in a fully closed position, and with the flow rate being a highest rate when the flow rate valve is in a fully opened position. The method includes controlling, automatically by a computing system, the hydraulic fluid source and operation of the flow rate valve to sequentially perform a standby mode test and a crank speed mode test, the flow rate valve being in the fully closed position for the standby mode test, the flow rate valve being in the fully opened position for the crank speed mode test. The method further includes monitoring, by the computing system, a standby rotational speed of the turbomachine during the standby mode test and a crank rotational speed of the turbomachine during the crank speed mode test. Additionally, the method includes controlling, automatically by the computing system, when the standby rotational speed is within a standby speed range and the crank rotational speed is within a crank speed range, the hydraulic fluid source and the operation of the flow rate valve to perform a medium-speed crank calibration to determine a medium-speed crank position of the flow rate valve, a rotational speed of the turbomachine being within a medium-speed range when the hydraulic fluid source supplies the fluid at the high pressure and the flow rate valve is in the medium-speed crank position.

What is claimed is:
1. A system for calibrating hydraulic starters for turbomachines, the system comprising:
    a hydraulic fluid source operable to supply a fluid at a high pressure or at a low pressure;
    a hydraulic starter rotatably driven by the fluid from the hydraulic fluid source;

a flow rate valve fluidly coupled between the hydraulic fluid source and the hydraulic starter, the flow rate valve being movable between a plurality of positions including a fully closed position and a fully opened position to adjust a flow rate of the fluid supplied from the hydraulic fluid source to the hydraulic starter, the flow rate being a lowest rate when the flow rate valve is in the fully closed position, the flow rate being a highest rate when the flow rate valve is in the fully opened position;

a speed sensor configured to detect a rotational speed of the turbomachine; and a computing system, the computing system being configured to:

receive a request to perform an automatic diagnostic run of the hydraulic starter;

control the hydraulic fluid source and operation of the flow rate valve to perform the automatic diagnostic run based at least in part on the request, the automatic diagnostic run comprising automatically sequentially performing a plurality of base modes, the flow rate valve being in either the fully closed position or the fully opened position in the plurality of base modes, the plurality of base modes including at least one standby mode test and at least one crank speed mode test, the flow rate valve being in the fully closed position for each of the at least one standby mode test, the flow rate valve being in the fully opened position for each of the at least one crank speed mode test; and monitor the rotational speed of the turbomachine during each of the plurality of base modes.

2. The system of claim 1, wherein the at least one standby mode test includes one or more of a low-speed standby mode or a high-speed standby mode, the hydraulic fluid source being configured to supply the fluid at the low pressure and the flow rate valve being in the fully closed position for the low-speed standby mode, the hydraulic fluid source being configured to supply the fluid at the high pressure and the flow rate valve being in the fully closed position for the high-speed standby mode, and wherein the at least one crank speed mode test includes one or more of a low-speed crank mode or a high-speed crank mode, the hydraulic fluid source being configured to supply the fluid at the low pressure and the flow rate valve being in the fully opened position for the low-speed crank mode, and the hydraulic fluid source being configured to supply the fluid at the high pressure and the flow rate valve being in the fully opened position for the high-speed crank mode.

3. The system of claim 2, wherein the computing system is configured to control the hydraulic fluid source and the flow rate valve to perform the automatic diagnostic run by automatically controlling the hydraulic fluid source and the flow rate valve to perform the low-speed standby mode, the high-speed standby mode after performing the low-speed standby mode, the low-speed crank mode after performing the high-speed standby mode, and the high-speed crank mode after performing the low-speed crank mode.

4. The system of claim 1, wherein, when the rotational speed of the turbomachine detected by the speed sensor in each of the plurality of base modes is within a respective speed range, the computing system is configured to automatically perform a medium-speed crank calibration with the computing system being configured to:

control the hydraulic fluid source to supply the fluid at the high pressure;

control the operation of the flow rate valve to move the flow rate valve into a first position of the plurality of positions, the flow rate of the fluid supplied from the hydraulic fluid source to the hydraulic starter being a first rate when the flow rate valve is in the first position, the first rate being between the lowest rate and the highest rate; and control the operation of the flow rate valve to move the flow rate valve from the first position at a given rate to adjust the flow rate until the rotational speed of the turbomachine is within a medium-speed range for the medium-speed crank calibration.

5. The system of claim 4, wherein the computing system is further configured to set a medium-speed crank position of the flow rate valve as a position of the plurality of positions of the flow rate valve when the rotational speed of the turbomachine is within the medium-speed range during the medium-speed crank calibration.

6. The system of claim 4, wherein the computing system is further configured to control an operation of a user interface to indicate that the medium-speed crank calibration failed when the rotational speed of the turbomachine detected by the speed sensor in the medium-speed crank calibration is not within the medium-speed range before the flow rate valve is in the fully opened position.

7. The system of claim 1, wherein, when the rotational speed of the turbomachine detected by the speed sensor in one or more of the plurality of base modes is outside a respective speed range after a threshold time has elapsed, the computing system is further configured to control an operation of a user interface to indicate each of the one or more of the plurality of base modes.

8. The system of claim 1, wherein the hydraulic fluid source has a high pressure port for supplying the fluid at the high pressure and a low pressure port for supplying the fluid at the low pressure, the hydraulic fluid source further comprising a supply actuator actuatable to direct fluid through the high pressure port or the low pressure port of the hydraulic fluid source.

9. A method for calibrating a hydraulic starter for a turbomachine, a hydraulic fluid source being operable to supply a fluid at a high pressure or at a low pressure for rotatably driving the hydraulic starter, a flow rate valve being fluidly coupled between the hydraulic fluid source and the hydraulic starter, the flow rate valve being movable between a plurality of positions including a fully closed position and a fully opened position to adjust a flow rate of the fluid supplied from the hydraulic fluid source to the hydraulic starter, the flow rate being a lowest rate when the flow rate valve is in the fully closed position, the flow rate being a highest rate when the flow rate valve is in the fully opened position, the method comprising:

receiving, by a computing system, a request to perform an automatic diagnostic run of the hydraulic starter;

controlling, automatically by the computing system, the hydraulic fluid source and operation of the flow rate valve to perform the automatic diagnostic run based at least in part on the request, the automatic diagnostic run comprising sequentially performing a plurality of base modes, the flow rate valve being in either the fully closed position or the fully opened position in the plurality of base modes, the plurality of base modes including at least one standby mode test and at least one crank speed mode test, the flow rate valve being in the fully closed position for each of the at least one standby mode test, the flow rate valve being in the fully opened position for each of the at least one crank speed mode test; and monitoring, by the computing system, a rotational speed of the turbomachine detected by a speed sensor during each of the plurality of base modes.

10. The method of claim 9, wherein the at least one standby mode test includes one or more of a low-speed standby mode or a high-speed standby mode, the hydraulic fluid source being configured to supply the fluid at the low pressure and the flow rate valve being in the fully closed position for the low-speed standby mode, the hydraulic fluid source being configured to supply the fluid at the high pressure and the flow rate valve being in the fully closed position for the high-speed standby mode, and wherein the at least one crank speed mode test includes one or more of a low-speed crank mode or a high-speed crank mode, the hydraulic fluid source being configured to supply the fluid at the low pressure and the flow rate valve being in the fully opened position for the low-speed crank mode, and the hydraulic fluid source being configured to supply the fluid at the high pressure and the flow rate valve being in the fully opened position for the high-speed crank mode.

11. The method of claim 10, wherein controlling the hydraulic fluid source and the flow rate valve to perform the automatic diagnostic run comprises automatically controlling the hydraulic fluid source and the flow rate valve to perform the low-speed standby mode, the high-speed standby mode after performing the low-speed standby mode, the low-speed crank mode after performing the high-speed standby mode, and the high-speed crank mode after performing the low-speed crank mode.

12. The method of claim 9, wherein, when the rotational speed of the turbomachine in each of the plurality of base modes is within a respective speed range, the method further comprises automatically performing a medium-speed crank calibration by:

controlling, by the computing system, the hydraulic fluid source to supply the fluid at the high pressure;

controlling, by the computing system, the operation of the flow rate valve to move the flow rate valve into a first position of the plurality of positions, the flow rate of the fluid supplied from the hydraulic fluid source to the hydraulic starter being a first rate when the flow rate valve is in the first position, the first rate being between the lowest rate and the highest rate; and controlling, by the computing system, the operation of the flow rate valve to move the flow rate valve from the first position at a given rate to adjust the flow rate until the rotational speed of the turbomachine is within a medium-speed range for the medium-speed crank calibration.

13. The method of claim 12, wherein the medium-speed crank calibration further comprises determining, by the computing system, a medium-speed crank position of the flow rate valve as a position of the plurality of positions of the flow rate valve when the rotational speed of the turbomachine is within the medium-speed range.

14. The method of claim 12, wherein the medium-speed crank calibration further comprises controlling, by the computing system, an operation of a user interface to indicate that the medium-speed crank calibration failed when the rotational speed of the turbomachine detected in the medium-speed crank calibration is not within the medium-speed range before the flow rate valve is in the fully opened position.

15. The method of claim 12, wherein, after the medium-speed crank calibration, the method further comprises:

controlling, by the computing system, the hydraulic fluid source to stop supplying the fluid and the operation of the flow rate valve to move the flow rate valve into the fully closed position; and controlling, by the computing system, an operation of a user interface to indicate an error when the rotational speed of the turbomachine is above a stop threshold when a threshold time has elapsed after the hydraulic fluid source is controlled to stop supplying the fluid.

16. The method of claim 9, wherein, when the rotational speed of the turbomachine detected in one or more of the plurality of base modes is outside a respective speed range, the method further comprises controlling, by the computing system, an operation of a user interface to indicate each of the one or more of the plurality of base modes.

17. The method of claim 9, wherein the hydraulic fluid source has a high pressure port for supplying the fluid at the high pressure and a low pressure port for supplying the fluid at the low pressure, wherein controlling the hydraulic fluid source and the flow rate valve to perform the automatic diagnostic run comprises controlling a supply actuator of the hydraulic fluid source, the supply actuator being controllable to direct fluid through the high pressure port or the low pressure port of the hydraulic fluid source.

18. The method of claim 9, further comprising:

controlling, by the computing system, the hydraulic fluid source to stop supplying the fluid after each of the plurality of base modes; and controlling, by the computing system, an operation of a user interface to indicate an error when the rotational speed of the turbomachine is above a stop threshold when a threshold time has elapsed after the hydraulic fluid source is controlled to stop supplying the fluid.

19. The method of claim 18, further comprising:

controlling, by the computing system, the hydraulic fluid source and the flow rate valve to stop automatically sequentially performing the plurality of base modes when the rotational speed of the turbomachine is above the stop threshold when the threshold time has elapsed after the hydraulic fluid source is controlled to stop supplying the fluid.

20. A method for calibrating a hydraulic starter for a turbomachine, a hydraulic fluid source being operable to supply a fluid at a high pressure or at a low pressure for rotatably driving the hydraulic starter, a flow rate valve being fluidly coupled between the hydraulic fluid source and the hydraulic starter, the flow rate valve being movable to adjust a flow rate of the fluid supplied from the hydraulic fluid source to the hydraulic starter, the flow rate being a lowest rate when the flow rate valve is in a fully closed position, the flow rate being a highest rate when the flow rate valve is in a fully opened position, the method comprising:

controlling, automatically by a computing system, the hydraulic fluid source and operation of the flow rate valve to sequentially perform a standby mode test and a crank speed mode test, the flow rate valve being in the fully closed position for the standby mode test, the flow rate valve being in the fully opened position for the crank speed mode test;

monitoring, by the computing system, a standby rotational speed of the turbomachine during the standby mode test and a crank rotational speed of the turbomachine during the crank speed mode test; and controlling, automatically by the computing system, when the standby rotational speed is within a standby speed range and the crank rotational speed is within a crank speed range, the hydraulic fluid source and the operation of the flow rate valve to perform a medium-speed crank calibration to determine a medium-speed crank position of the flow rate valve, a rotational speed of the turbomachine being within a medium-speed range when the hydraulic fluid source supplies the fluid at the high pressure and the flow rate valve is in the medium-speed crank position.

\* \* \* \* \*